United States Patent [19]
Minowa et al.

[11] Patent Number: 5,285,145
[45] Date of Patent: Feb. 8, 1994

[54] CURRENT-LIMIT SYSTEM FOR VOLTAGE-TYPE INVERTER

[75] Inventors: Hirofumi Minowa; Masaru Yamazoe; Takao Yanase; Shin'ichi Ishii; Yoshinobu Nagao, all of Kawasaki, Japan

[73] Assignee: Fuji Electric Co., Ltd., Kanagawa, Japan

[21] Appl. No.: 474,051
[22] PCT Filed: Aug. 30, 1989
[86] PCT No.: PCT/JP89/00889
 § 371 Date: Apr. 24, 1990
 § 102(e) Date: Apr. 24, 1990
[87] PCT Pub. No.: WO90/02442
 PCT Pub. Date: Mar. 8, 1990

[30] Foreign Application Priority Data

Aug. 30, 1988 [JP] Japan ................. 63-215585
Dec. 12, 1988 [JP] Japan ................. 63-313497
Dec. 19, 1988 [JP] Japan ................. 63-320118
Mar. 6, 1989 [JP] Japan ................. 1-53521
May 29, 1989 [JP] Japan ................. 1-135045
Jun. 23, 1989 [JP] Japan ................. 1-162270

[51] Int. Cl.$^5$ ............................................. H02P 5/40
[52] U.S. Cl. ................................. 318/808; 318/809; 318/802
[58] Field of Search ............... 318/801, 802, 805, 808, 318/811, 812, 430, 432, 434, 809, 803

[56] References Cited
U.S. PATENT DOCUMENTS
4,275,343 6/1981 Fulton et al. ................. 318/721
4,722,042 1/1988 Asano et al. ................. 318/802

FOREIGN PATENT DOCUMENTS
62-141997 6/1987 Japan.

Primary Examiner—William M. Shoop, Jr.
Assistant Examiner—John W. Cabeca
Attorney, Agent, or Firm—Spencer, Frank & Schneider

[57] ABSTRACT

A current transformer (4) detects the output currents of a voltage-type inverter (INV), and comparators (6) check whether the outputs from the current transformer exceed a predetermined limit value. The detected output currents are fed to a vector analyzer (8) to determine the location of the output current vector. A zone determining circuit (9) determines the location of the current vector in the zones. An output pattern generating circuit (10) responds to the output from the zone determining circuit (9) and provides a switching pattern corresponding to the voltage vector nearest to a vector having the direction opposite to that of the output current vector. A selector (2), being controlled by the comparator (6), selects a switching pattern from the output pattern generating circuit and provides it to the inverter (INV), when the comparator (6) detects that the magnitude of the current vector exceeds the predetermined limit value. The rate of change of the output current vector works so as to reduce the current regardless of whether the motor (IM) (a load of the inverter) is to be driven or braked, regardless of the location of the counter-electromotive force vector or the location of the voltage vector selected at that timing when the current limit enters into action. This ensures that the output current of the inverter (INV) will be reduced.

2 Claims, 15 Drawing Sheets

CURRENT-LIMIT SYSTEM FOR VOLTAGE-TYPE INVERTER

FIELD OF THE INVENTION

The present invention relates to a current-limit system for a voltage-type inverter, and more particularly to a current-limit system that limits the output current of the inverter which increases in response to any changes in the frequency set value or any unexpected or sudden changes in the load of the inverter.

BACKGROUND OF THE INVENTION

The inventors of the present application proposed, in their earlier Japanese Patent Application Laying-Open No. 62-123965, a current-limit system that can be used in voltage-type PWM (pulse-width modulation) control inverters. An example of the principal circuit of a PWM control inverter to which the current-limit system may be applied is shown in FIG. 22. In FIG. 22, $E_1$ designates a dc (direct current) power supply, INV, an inverter, $Tr_1$ to $Tr_6$, transistors, $D_1$ to $D_6$, feedback diodes that have inverse-parallel connections across the transistors $Tr_1$ to $Tr_6$, and IM denotes a three-phase induction motor (which will be simply referred to "motor") that serves as a load.

The inverter INV provides the constant V/f (voltage/frequency) control in the known manner: the appropriate command value for the output voltage of the inverter INV is generated based on the frequency set value for the output voltage; this command value is compared with a carrier waveform so that a PWM signal may be produced; and this PWM signal enables the transistors $Tr_1$ to $Tr_6$ to provide the output voltage of the inverter INV that meets the requirements specified by the output voltage command value mentioned above.

The output current limit system for the inverter INV is provided with a current transformer or the like to measure the magnitude of currents iu, iv, and iw of respective phases (u, v, w), in order to determined that any of the currents exceed their specific limit value. If one of the phase currents iu, iv, and iw exceeds its positive limit value, the transistor in the upper arm for that phase is turned off, whereas if one of the currents exceeds its negative limit value, the transistor in the lower arm for the phase is turned off. This current-limit system will be described more specifically below.

First, it is assumed that respective phase currents are positive when they flow in the direction shown in FIG. 22, in the case where the motor IM is driven by the inverter INV. Then, it is also assumed that each pair of transistors $Tr_1$ and $Tr_4$, transistors $Tr_2$ and $Tr_5$, and transistors $Tr_3$ and $Tr_6$ in the upper and lower arms that forms a phase u, a phase v, and a phase w, respectively, has a switching pattern represented by (Su, Sv, Sw). It is noted that the corresponding transistors in the upper arm are in the ON state when Su, Sv and Sw assume the value of "1", respectively, whereas the corresponding transistors in the lower arm are in the ON state when Su, Sv and Sw assume the value of "0" respectively.

If the current of the phase u exceeds its positive limit value when the switching pattern is (1 0 0) (which means that transistors $Tr_1$, $Tr_5$ and $Tr_6$ are in the ON state), the switching pattern for the phase u will be forced to change from "1" to "0". Changing the switching pattern to (0 0 0) causes the transistor $Tr_1$ in the upper arm for the phase u to turn off, decreasing the u-phase current flow. Changing the switching pattern from "1" to "0" with regard to u-phase means to turn off the transistor $Tr_1$ in the upper arm while turning on the transistor $Tr_4$ in the lower arm. Turning the transistor $Tr_1$ off when the current flows in the positive direction makes the current to flow through the transistors in the lower arms of the other phases and through the diode $D_4$ in the lower arm of the unphase. Therefore, the fact that the transistor $Tr_4$ is turned on has no significant meaning. Rather, turning off the transistor $Tr_1$ of the upper arm makes the current flow decrease.

If the u-phase current flow exceeds its negative limit value, the transistor $Tr_4$ is turned off, thus decreasing the current flow.

The rate of change of the current vector i flowing through the motor IM can be obtained from the output voltage vector V of the inverter INV, the counter electromotive force vector e of the motor IM, and the motor leakage inductance l, and is approximately expressed by the following equation.

$$l \cdot di/dt = (V - e) \tag{1}$$

The output voltage of the inverter INV shown in FIG. 22 can provide eight types of voltage vectors because there are eight ($2^3$) switching patterns. Those switching patterns can be represented by the respective voltage vectors consisting of the voltage vectors $V_1$ to $V_6$ and the zero voltage vectors $V_0$, $V_7$, which are spaced by every $\pi/3$ (rad) as shown in FIG. 23. Respective phase currents iu, iv and iw shown in FIG. 22 are also shown in FIG. 23.

To produce a desired voltage vector V, the PWM inverter INV described above forms an equivalent voltage vector V having the desired magnitude and angle: the voltage vectors adjacent to the voltage vector V and the zero voltage vectors $V_0$, $V_7$ (when the voltage vector V is located as indicated in FIG. 23, for example, the voltage vectors $V_3$, $V_4$ are adjacent to the vector V) are selected from the it eight voltage vectors $V_0$ to $V_7$ in a time division manner within a specific time interval so as to produce the desired voltage vector V. Thus, the inverter INV may be controlled according to the switching patterns which correspond to the voltage vectors $V_3$, $V_4$, $V_0$ and $V_7$.

Referring now to the vector diagram in FIG. 24, let us consider the way the output current of the inverter is limited when the motor IM in FIG. 22 is driven by the inverter.

Let us suppose that the inverter selects the voltage vector $V_1$ (switching pattern of (1 0 0)) in a time division manner so as to produce output voltage Va in FIG. 24 while driving the motor IM, and that the u-phase current iu exceeds its positive limit value during this phase. In this case, the voltage vector $V_0$ corresponding to the switching pattern (0 0 0) in which Su is set to "0" is selected. As a result, the direction of di/dt will be that of $(l \cdot di/dt)_1$, being determined by the above equation (1), the counter-electromotive forces el and $V_0$. This will decrease the u-phase current iu.

On the other hand, let us suppose that the inverter INV selects the voltage vector $V_3$ (the switching pattern (0 1 0)) in a time division manner to produce output voltage $V_b$ while braking the motor IM, and that the u-phase current iu exceeds its positive limit value at that time. In this case, the conventional system changes the u-phase Su of the switching pattern to "0". However, the Su in this pattern is originally "0", and so the switching pattern remains (0 1 0). In other words, this switching pattern continues to provide output voltage $V_3$. The direction of di/dt, in this case, will be that of $(l \cdot di/dt)_2$, being determined by the above equation (1), the counter electromotive force $e_2$ and $V_3$. This direction possesses the positive component of the u-phase current iu. This presents a problem that the current iu cannot be limited (or decreased) by the above method.

DISCLOSURE OF THE INVENTION

The present invention is proposed to solve the above-described problems. The object of the present invention is to provide a current-limit system for use in the voltage-type inverter, which ensures that the output current can be decreased during driving or braking the motor, regardless of the location of the selected voltage vector.

To accomplish the above object, a first aspect of the present invention includes first means for detecting the magnitude of an output current vector of the voltage-type inverter to determine if the magnitude exceeds a predetermined limit value; second means for detecting the location of the output current vector; and third means for selecting a voltage vector wherein the location of the selected voltage vector is closest to a vector having the opposite direction to the output current vector determined by the second means, and for enabling the voltage-type inverter to produce the selected voltage vector as the output, when the magnitude of the output current vector exceeds the predetermined limit value.

A second aspect of the present invention includes first means for detecting the magnitude of the output current vector of the voltage type inverter to determine if the magnitude exceeds a predetermined limit value; second means for determining the location of the output current vector; sixth means for determining the location of the counter-electromotive force vector of a load of the voltage-type inverter according to the output current and output voltage of the voltage-type inverter; and seventh means for selecting a voltage vector which reduces the output current in such a way that the rate of reduction of the output current is minimum on the basis on the locations of the output current vector and counter electromotive force vector, and for enabling the voltage-type inverter to produce the selected voltage vector as the output, when the magnitude of the output current vector exceeds its limit value.

A third aspect of the present invention includes, switching elements having a corresponding phase in an upper arm and lower arm, respectively, first current limiting circuit means for turning off the switching element of the corresponding phase in the upper arm of the voltage-type inverter when the magnitude of any one of the output currents of respective phases exceeds a positive limit value, and for turning off the switching element of the corresponding phase in the lower arm of the voltage-type inverter when the magnitude of any one of the output currents of respective phases of the voltage-type inverter exceeds a negative limit value; second current limiting circuit means including first means for detecting the magnitude of an output current vector of the voltage-type inverter to determine if the magnitude exceeds a predetermined limit value, second means for detecting the location of the output current vector and third means for selecting a voltage vector wherein the location of the selected voltage vector is closest to a vector having the opposite direction to that of the output current vector, and for enabling the voltage type inverter to produce the selected voltage vector when the magnitude of any one of the output currents in the voltage-type inverter exceeds the positive or negative limit value; and switching circuit means which receives the outputs from the first and second current limiting circuit means, and executes the current limiting action in response to the output from the first current limiting circuit means when the motor controlled by the voltage-type inverter is being driven, or executes the current limiting action in response to the output from the second current limiting circuit means when the motor is being braked.

A fourth aspect of the present invention comprises switching elements having a corresponding phase in an upper arm and lower arm, respectively, means for detecting a magnitude of an output current of each phase in the voltage-type inverter and for determining whether the magnitude exceeds a positive or negative limit value; first current limiting circuit means for turning off the switching element of the corresponding phase in the upper arm when the magnitude of any one of the output currents exceeds the positive limit value, and for turning off the switching element of the corresponding phase in the lower arm when the magnitude of any one of the output currents of the voltage-type inverter exceeds the negative limit value; second current limiting circuit means including first means for detecting the magnitude of an output current vector of the voltage-type inverter to determine if the magnitude exceeds a predetermined limit value, second means for detecting the location of the output current vector and third means for selecting a voltage vector wherein the location of the selected voltage vector is closest to a vector having the opposite direction to that of the output current vector, and for enabling the voltage-type inverter to produce the selected voltage vector, when the magnitude of any one of the output currents of the voltage-type inverter exceeds the positive or negative limit value; decision circuit means for deciding which of the first and second current limiting circuit means should be selected to perform the current limiting action in response to the switching pattern of the voltage-type inverter at the time when the magnitude of any one of the output currents exceeds the positive or negative limit value, and in response to the detecting result which of the phase currents exceeds the positive or negative limit value; and switching circuit means for selecting either the first or second current limiting circuit means according to the output of the decision circuit means, and for producing the output of the selected circuit means.

A fifth aspect of the present invention comprising switching elements having a corresponding phase in an upper arm and lower arm, respectively, means for detecting a magnitude of an output current of each phase in the voltage-type inverter, and for determining whether the magnitude exceeds a positive or negative limit value; first current limiting circuit means for turning off the switching element of a corresponding phase in an upper arm of the voltage-type inverter when the magnitude of any one of the output currents of the voltage-type inverter exceeds the positive limit value, and for turning off the switching element of the corresponding phase in a lower arm of the voltage-type inverter when the magnitude of any one of the output currents exceeds the negative limit value; all-element-off circuit means for turning off the switching elements of all the phases when the magnitude of any one of the output currents exceeds the positive or negative limit value; and switching circuit means switched in response to a driving/braking signal of a motor which is controlled by the voltage-type inverter, the switching circuit means selecting the output from the first current limiting circuit means when the motor is being driven, or selecting the output from the all-element-off circuit means when the motor is being braked.

According to the first aspect of the present invention, the output current of the inverter can be surely reduced when the current limit is activated: the rate of change of the output current vector functions so as to reduce the current flow regardless of the driving/braking state of the motor, the location of the counter-electromotive force vector, or the location of the voltage vector selected at that time. This is because the voltage vector nearest to the vector having the opposite direction to the output current vector is outputted when the current limit action takes place.

According to the second aspect of the present invention, the inverter functions so as to output the optimum voltage vector by obtaining the location of the current vector and the counter-electromotive force vector on the basis of the output of the inverter when the current flow exceeds its limit value. This is accomplished because the voltage vector that reduces the phase current flow exceeding its specific limit value, and provides the minimum rate of reduction for the phase current flow is previously determined according to the location of the output current vector and the counterelectromotive force vector.

According to the third aspect of the present invention, the current limiting action is performed as in the first aspect of the present invention when the motor is being braked. In addition, when the motor is driven, the current limiting action is performed while maintaining the rate of current reduction at a low value, thereby keeping the current within the specified limit value.

According to the fourth aspect of the present invention, the optimum current limit mode is selected according to the switching pattern at the time when the current limiting action turns into effect, and according to the detecting result which of the phase currents has exceeded its positive or negative limit value, and then the current limiting action is performed by switching between the first and second current limiting circuits to provide the appropriate current limit mode.

According to the fifth aspect of the present invention the current limiting action is performed by the first current limiting current means mentioned in the third aspect of the present invention when the motor is driven. In addition, when the motor is braked, all switching elements for the inverter are turned off, forcing the output current for each phase to be reduced.

BEST FORMS OF EMBODYING THE INVENTION

The invention will now be described with reference to the accompanying drawings.

FIRST EMBODIMENT

Figure 1:
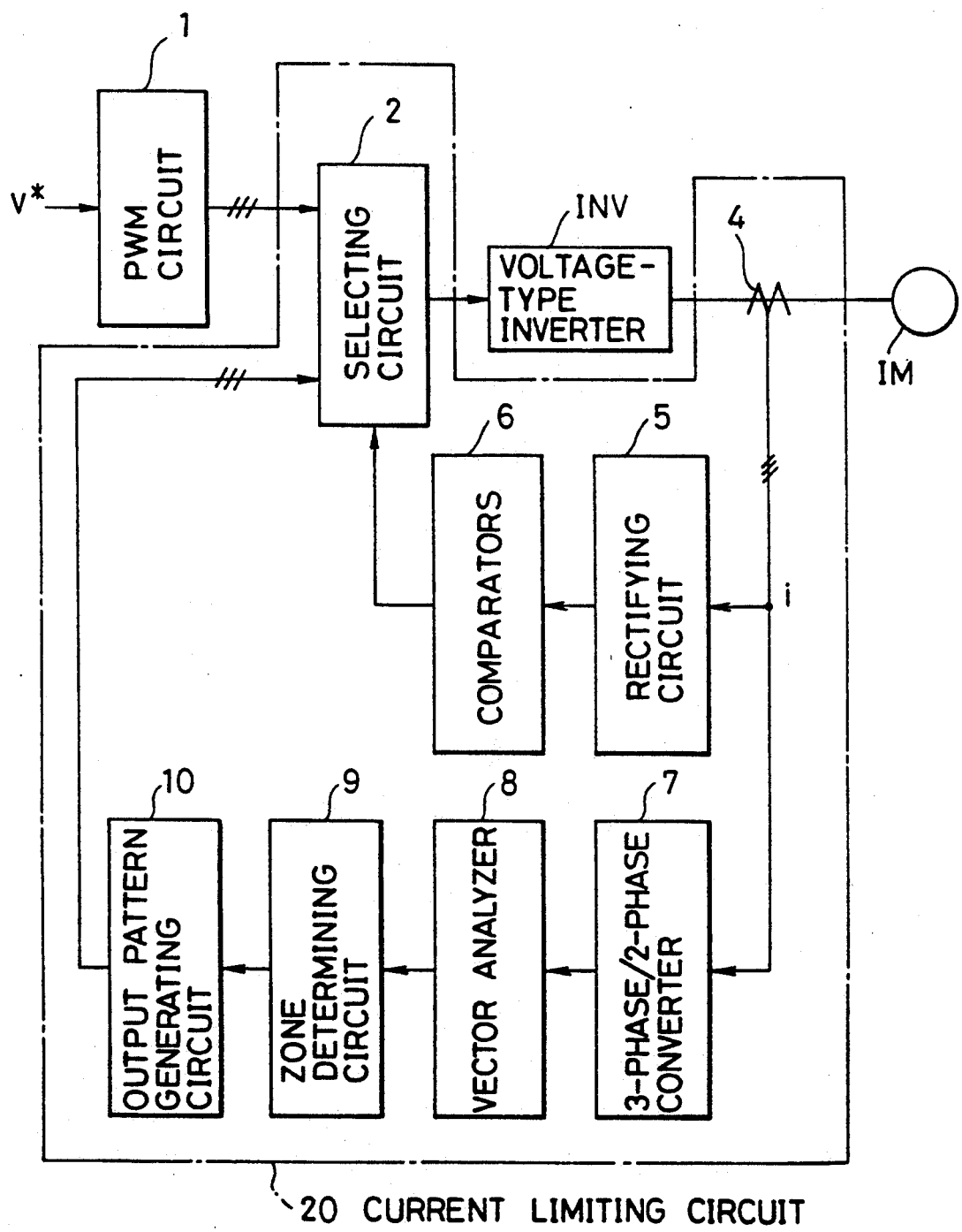
FIG. 1 is a block diagram showing a current limiting circuit together with an inverter used in a first embodiment of the present invention.

FIG. 1 is a block diagram showing a current limiting circuit 20 according to the first aspect of the present invention, together with an inverter and other associated elements.

In FIG. 1, reference numeral 1 designates a known PWM circuit responsive to a voltage command V* and provides a switching pattern output which meets the requirements of the voltage command. Reference numeral 2 designates a selecting (or switching) circuit that selectively provides the switching pattern output either from the PWM circuit 1 or from an output pattern generating circuit 10 to be described later. INV denotes a PWM-controlled voltage-type inverter. Reference numeral 4 designates a current transformer used as a current detector provided at the output of the inverter INV. IM designates a motor, such as an induction motor serving as a load. Reference numeral 5 denotes a rectifying circuit, 6 designates a comparating circuit which responds to the output from the rectifying circuit 5, and detects if respective phase currents exceed their respective limit values. Reference numeral 7 designates a 3-phase/2-phase conversion circuit, 8 denotes a vector analyzer that analyzes the current vector and determines its angle, 9 designates a zone determining circuit for determining the location of the current vector, and 10 designates an output pattern generating circuit for providing the appropriate switching pattern when the current limiting action is in effect.

Figure 2:
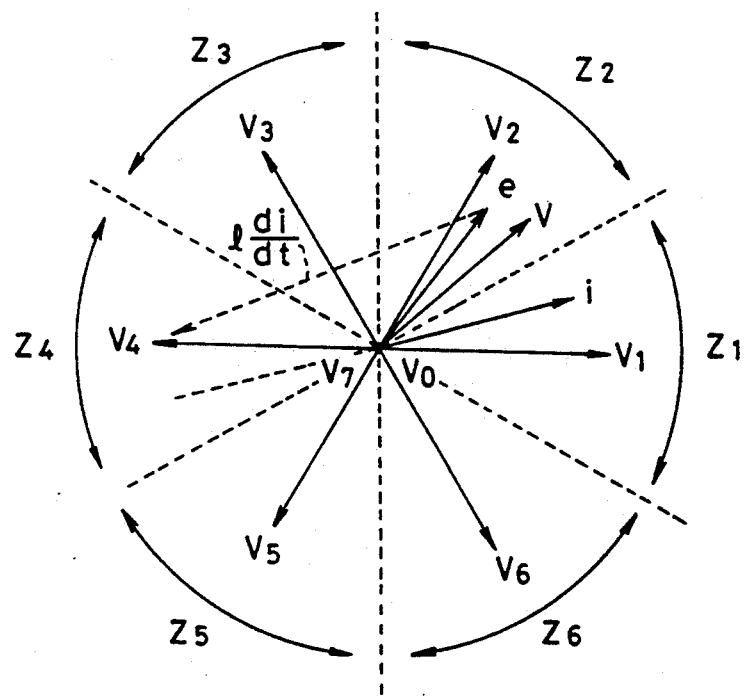
FIGS. 2 and 3 are voltage and current vector diagrams for explaining the current limiting action of the first embodiment.
Figure 3:
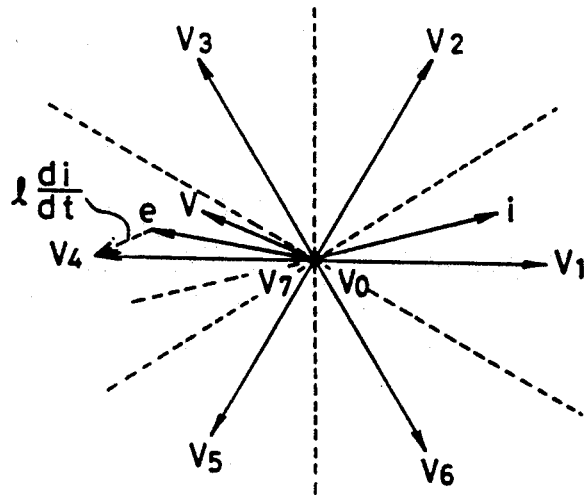

Next, referring to FIGS. 2 and 3, the operation of the current limiting circuit 20 is described. Here, FIG. 2 is the vector diagram at the time when the motor IM is being driven, and FIG. 3 is the vector diagram at the time when the motor IM is being dumped. As in FIG. 2, $V_0$ to $V_7$ designates the respective voltage vectors corresponding to the eight combinations of the switching pattern, V denotes the output voltage vector of the inverter INV, e designates the counter-electromotive force vector of the motor IM, i denotes the output current vector of the inverter INV, and l·di/dt represents the vector which varies with the rate of change of the current vector i.

First, the PWM circuit 1 normally responds to the voltage command value V* for providing the appropriate switching pattern for driving the semiconductor switching elements in the inverter INV, thus controlling the output voltage of the inverter INV so as to agree with the voltage command value V*. The current flow through each phase in the inverter INV is detected by the current detecting circuit 4. Those current flows are always monitored by the rectifying circuit 5 and comparating circuit 6 to check if they exceed their respective limit values. If the magnitude of any one of the current flow exceeds its limit value, the appropriate detecting signal is fed to the selecting circuit 2. Then, the selecting circuit 2 switches the switching pattern from the PWM circuit 1 to that from the output pattern generating circuit 10.

The current detecting signal produced from the current detecting circuit 4 is delivered to the three-phase/two-phase conversion circuit 7 from which a two-phase signal is outputted. This two-phase signal is fed to the vector analyzer 8 that determines the location of the current vector. Then, the zone determining circuit 9 determines the zone to which this current vector belongs: the zone is one of the six zones Z1 to Z6 separated by every $\pi/3$ (rad) as shown in FIG. 2. In response to the result provided by the zone determining circuit 9, the output pattern generating circuit 10 provides the appropriate switching pattern. The switching pattern is determined as shown in Table 1 by performing a predetermined algorithm described below according to the location (zone) of the current vector i.

TABLE 1

| Current Vector Location (Zone) | Switching Pattern | | |
|---|---|---|---|
| | (Su | Sv | Sw) |
| Z1 | (0 | 1 | 1) |
| Z2 | (0 | 0 | 1) |
| Z3 | (1 | 0 | 1) |
| Z4 | (1 | 0 | 0) |
| Z5 | (1 | 1 | 0) |
| Z6 | (0 | 1 | 0) |

For example, suppose that when the u-phase current exceeds its positive current limit value while the motor IM is driven, the current vector i is located in the zone Z1, and the output voltage vector V and the counter-electromotive force vector e lie in their respective locations as shown in FIG. 2. Then, a voltage vector $V_4$ located in the closest vicinity of a virtual vector opposite to the current vector i is selected. In addition, the switching pattern (0 1 1) for the voltage vector $V_4$ is chosen from Table 1. By so doing, l·di/dt, which varies with the rate of change of the current vector i as expressed by the equation (1) earlier mentioned, will act in the direction to reduce the unphase current. Thus, the output pattern generating circuit 10 produces the switching pattern (0 1 1) associated with the voltage vector $V_4$, and supplies the pattern to the selecting circuit 2.

At the same time, a detecting signal indicating that the current limit value is exceeded is also applied to the selecting circuit 2 through the rectifying circuit 5 and comparating circuit 6. The selecting circuit 2, recognizing the detecting signal, selects the switching pattern from the output pattern generating circuit 10 in place of the switching pattern from the PWM circuit 1. This enables the voltage-type inverter INV to provide the output voltage vector $V_4$. The vector $V_4$ in conjunction with the counter-electromotive force e can reduce the unphase current flow.

FIG. 3 is the vector diagram when the motor IM is being braked. Suppose that the u-phase current exceeds its positive value when the voltage vector $V_3$ is selected. In this case, the voltage vector $V_4$ located nearest to a virtual vector opposite to the current vector i is selected. This enables the output current to reduce because l·di/dt functions so as to reduce the u-phase current as in FIG. 2. This action is also effective if the voltage vector $V_0$ or $V_7$ is selected when the current exceeds its limit value.

Specific implementations of respective circuits 7, 8, 9, and 10 mentioned above will now be described.

Figure 14:
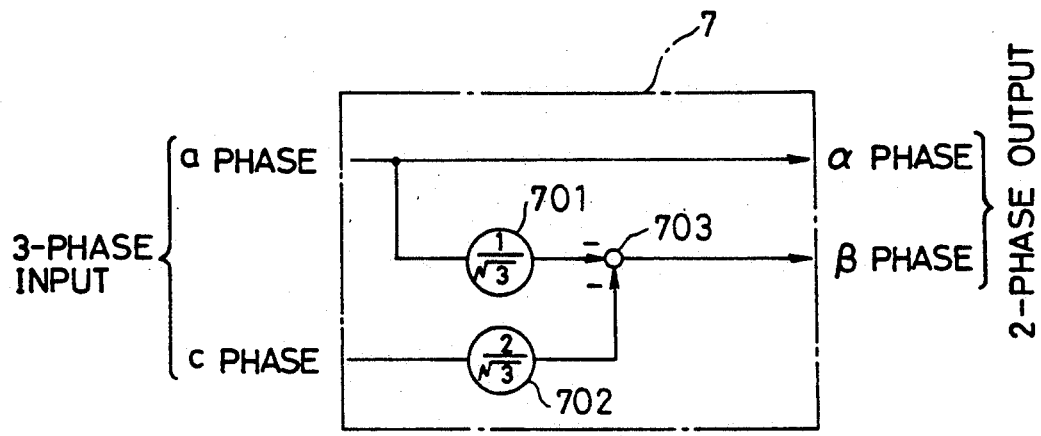
FIG. 14 is a block diagram showing a specific form of the 3-phase/2-phase conversion circuit I shown in FIG. 1.

The three-phase/two-phase conversion circuit 7 is a known circuit, and can be configured as shown in FIG. 14. In this example, the circuit 7 can convert any type of three-phase input (that is, current, voltage, or counter-electromotive force input) composed of phases a, b, and c into an output composed of phases $\alpha$ and $\beta$ the axes of which are orthogonal each other. The conversion matrix equation is expressed by $$\begin{pmatrix} \alpha \\ \beta \end{pmatrix} = \begin{pmatrix} a \\ -\frac{1}{\sqrt{3}} (a + 2c) \end{pmatrix}$$

The conversion circuit 7 performs the arithmetic operation of the above matrix equation. Therefore, the a-phase input is directly produced as the $\alpha$-phase output from the conversion circuit 7. The a-phase and c-phase inputs are supplied to an adder 703 through the respective weighting circuits 701 and 702 the weight factors of which are $1/\sqrt{3}$ and $2/\sqrt{3}$, respectively. This adder 703 sums up both inputs of $a/\sqrt{3}$ and $c/\sqrt{3}$ after reversing their polarities, providing output of $-(a+2c)/\sqrt{3}$ which will be produced as the $\beta$-phase output.

Figure 15:
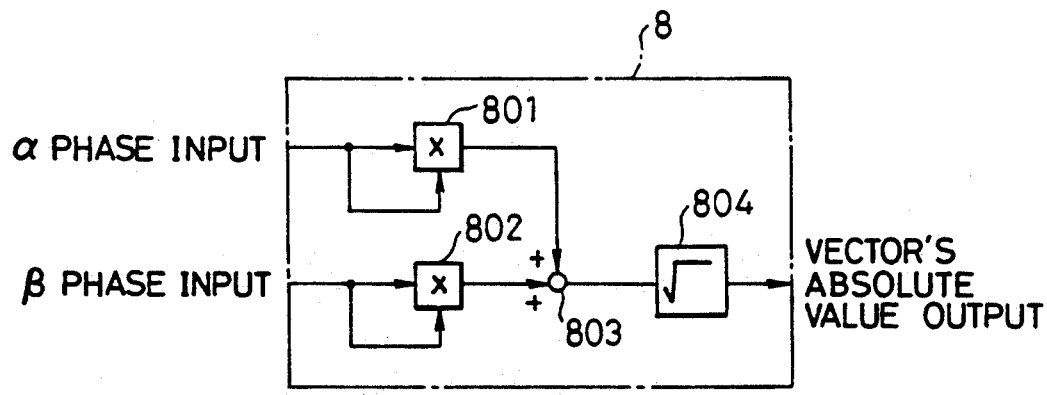
FIG. 15 is a block diagram showing an embodiment of the vector analyzer circuit 8 shown in FIG. 1.

FIG. 15 shows a configuration of the vector analyzer 8, which is known. This vector analyzer 8 computes the absolute value $\sqrt{\alpha^2+\beta^2}$ of a vector $(\alpha+j\beta)$ represented in terms of the $\alpha$-axis component and $\beta$-axis component. The $\alpha$-phase and $\beta$-phase inputs are supplied to multipliers 801 and 802, respectively, which output $\alpha^2$ and $\beta^2$, respectively. The outputs $\alpha^2$ and $\beta^2$ are fed to an adder 803 which outputs $(\alpha^2+\beta^2)$ The output $(\alpha^2+\beta^2)$ is fed to a square-root circuit 804 which outputs $\sqrt{\alpha^2+\beta^2}$.

Figure 16:
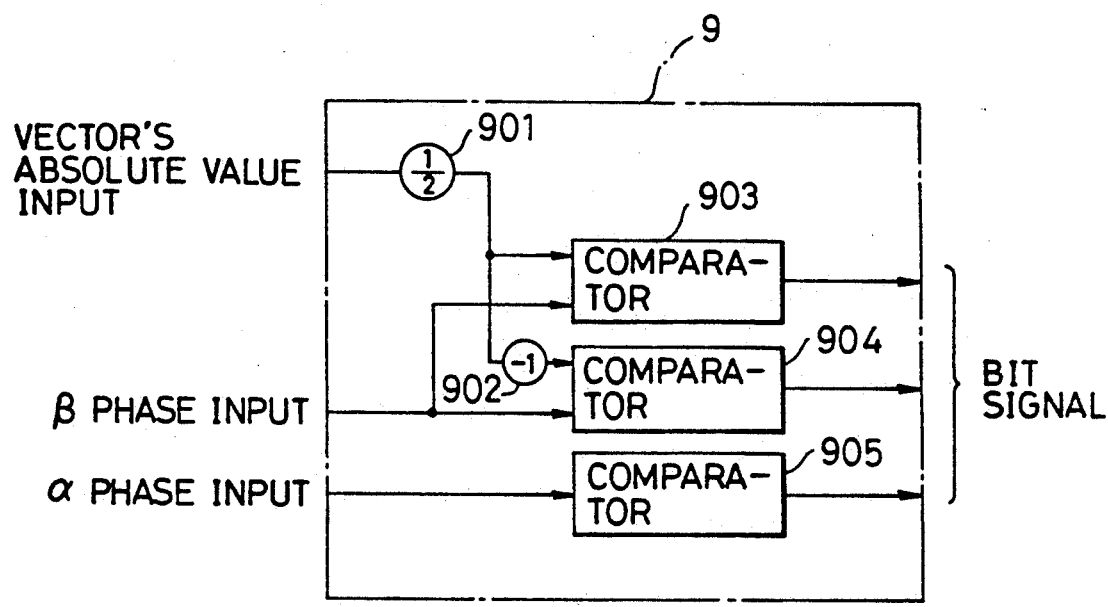
FIG. 16 is a block diagram showing an embodiment of the zone determining circuit 9 shown in FIG. 1.

The zone determining circuit 9, for example, can be configured as shown in FIG. 16. The circuit 9 determines the zone which includes the vector among the six zones $Z1, \ldots, Z6$ shown in FIG. 2 according to $\alpha$-axis component, $\beta$-axis component, and the absolute value of the vector. For this purpose, the absolute value is applied to an input terminal of a comparator 903 through a weighting circuit 901 the weight factor of which is $\frac{1}{2}$. The output of the weighting circuit 901 is also applied to an input terminal of a comparator 904 through a polarity reversing circuit 902. The $\beta$-phase input is supplied to the other input terminals of the comparators 903 and 904. The $\alpha$-phase input is supplied to a comparator 905. Each of those comparators 903, 904, and 905 performs logical comparing operations listed in Table 2.

TABLE 2

| Comparators | | | | |
|---|---|---|---|---|
| 903 $\frac{K_1}{2} \geq \beta$ | 904 $\frac{-K_1}{2} < \beta$ | 905 $\alpha \geq 0$ | Bit Signal | Zone |
| 1 | 1 | 1 | 111 | Z1 |
| 0 | 1 | 1 | 011 | Z2 |
| 0 | 1 | 0 | 010 | Z3 |
| 1 | 1 | 0 | 110 | Z4 |
| 0 | 0 | 0 | 000 | Z5 |
| 0 | 0 | 1 | 001 | Z6 |

Notes:
$K_1$ = the absolute value of the vector $(\alpha + j\beta)$
bit signal "1" means the comparator conditions are met.
bit signal "0" menas the comparator conditions are not met.

Figure 17:
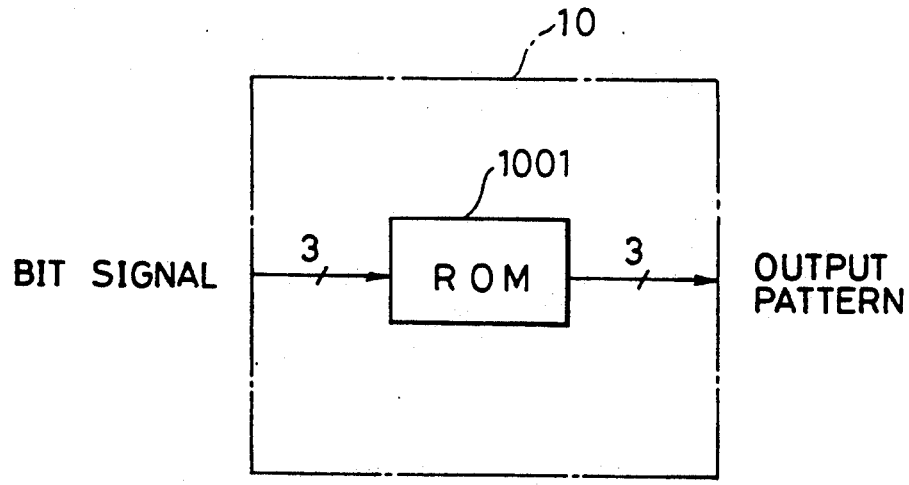
FIG. 17 is a block diagram showing an embodiment of the output pattern generating circuit 10 shown in FIG. 1.

FIG. 17 shows an example of the output pattern generating circuit 10. This circuit 10 consists of a ROM 1001 which stores the switching patterns shown in Table 1. The bit signal from the zone determining circuit 9 is applied to the ROM 1001 as address data for reading the switching pattern out, and the switching pattern thus retrieved is provided as the output pattern.

SECOND EMBODIMENT

Figure 4:
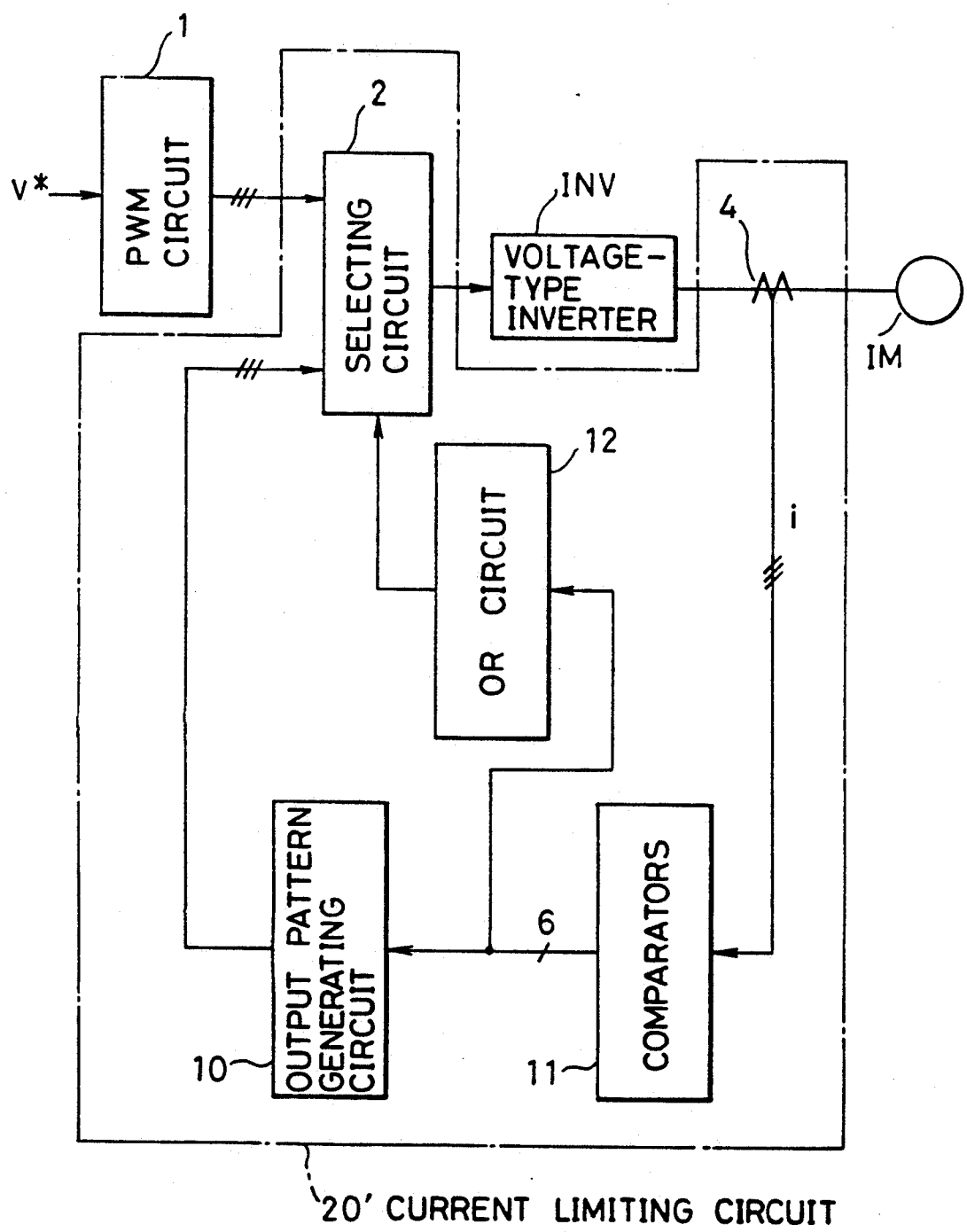
FIG. 4 is a block diagram showing a current limiting circuit in conjunction with an inverter used in a second embodiment of the present invention.

Next, FIG. 4 is a block diagram showing the current limiting circuit 20' in conjunction with the inverter INV and other associated elements used in the second embodiment of the first aspect of the present invention.

In this embodiment, only different portions from the first embodiment will be described to avoid repetitious description of FIG. 1. The current detecting signals i from the current detecting circuit 4 are applied to six comparators 11, each corresponding to the positive and negative polarities of each phase. Those comparators 11 detects each phase current to determine whether it exceeds its positive or negative current limit value.

More specifically, if any particular comparator provides the detecting signal informing that the current has exceeded its limit value, the zone to which the current vector i belongs will be determined accordingly. By using this zone, the voltage vector having the direction opposite to that of the current vector i is selected in a manner similar to that described in the preceding embodiment, and the corresponding switching pattern is provided by the output pattern generating circuit 10.

The output signal of each comparators 11 for the positive or negative polarity of each phase is fed to an OR circuit 12. This OR circuit 12 provides an OR output when any of the phase-currents exceeds the positive or negative current limit value. The OR output is then supplied to the selecting circuit 2 as a selector control signal. In response to the selector control signal, the selecting circuit 2 selects the switching pattern from the output pattern generating circuit 10 instead of the switching pattern from the PWM circuit 1.

Thus, if the u-phase current, for example, exceeds its limit value, the comparators 11 determine the zone associated with the current vector i at that time, and the voltage vector located nearest to the virtual vector having the opposite direction to that of the current vector i is selected. Then, the switching pattern corresponding to the selected voltage vector is produced from the output pattern generating circuit 10, as in the preceding embodiment. At the same time, the appropriate selector control signal is applied to the selecting circuit 2 through the OR-gate circuit 11, enabling the inverter INV to operate in accordance with the switching pattern provided by the output pattern generating circuit 10. As a result, the output current is controlled to be reduced.

The second embodiment has an advantage over the first embodiment in that the configuration of the current limiting circuit 20' becomes simpler.

THIRD EMBODIMENT

Next, an embodiment of the second aspect of the present invention will be described with reference to FIGS. 5 to 7.

The second aspect of the present invention not only controls the output current of the inverter to be reduced regardless of whether the motor is being driven or being braked as in the first aspect of the present invention, but also provides the voltage vector that can minimize the rate of current reduction when the current limit action is in effect, thereby reducing the current ripple effect during the effective current limit action.

Figure 5:
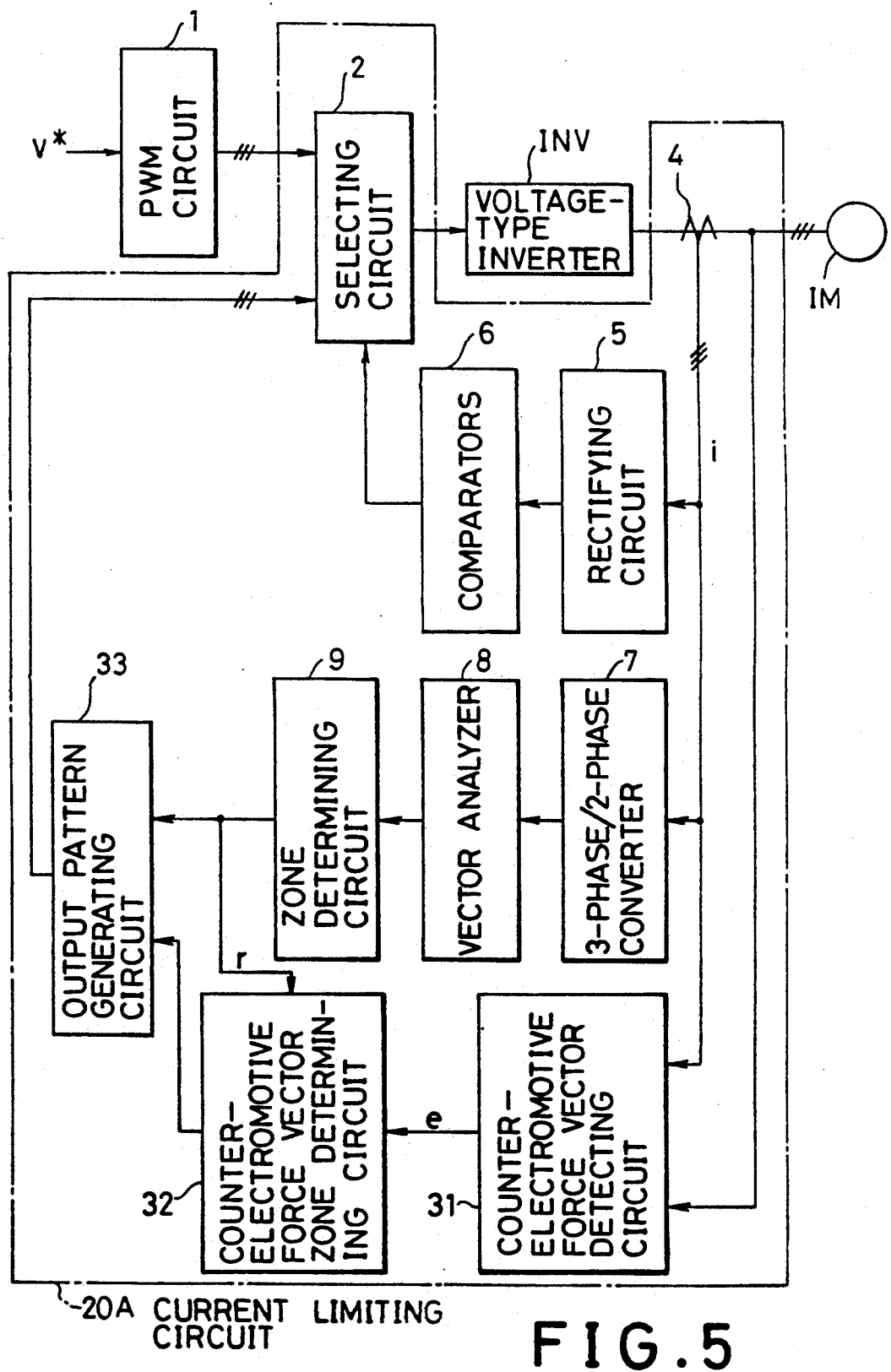
FIG. 5 is a block diagram showing a current limiting circuit together with an inverter used in a third embodiment of the present invention.

First, FIG. 5 is a block diagram showing the configuration of a current limiting circuit 20A in this embodiment in conjunction with the associated elements including the inverter INV.

In FIG. 5, reference numeral 31 designates a counter-electromotive force vector detecting circuit for obtaining the counter-electromotive force vector e for the motor IM on the basis of the current detecting signal i from the current detecting circuit 4 and the output voltage of the inverter INV. Reference numeral 32 designates a counterelectromotive force vector zone determining circuit for locating the counter-electromotive vector from the rotation angle signal r from the zone determining circuit 9 for the current vector and the counter-electromotive force vector e from the circuit 31. The rotation angle signal r is the signal that represents the angle of rotation required to superimpose the zone to which a particular current vector i belongs on the zone to which a reference vector Vn (to be described later) belongs. This angle of rotation is given by I(zone number) $-1$}$\times \pi/3$. Reference numeral 33 designates an output pattern generating circuit for producing the switching pattern of the voltage vector selected according to Table 2 (which will be described later), on the basis of the zone determining output from the zone determining circuit 9 and the determining output from the counter-electromotive force zone determining circuit 22.

Figure 6:
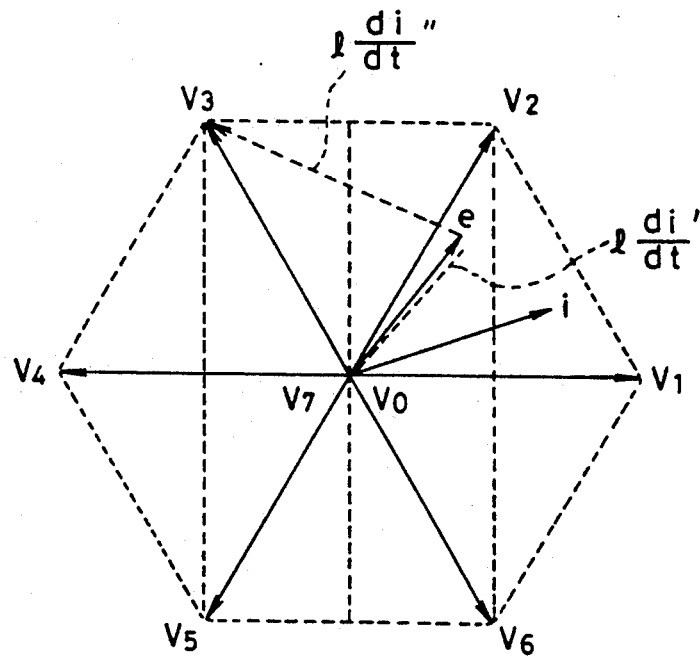
FIG. 6 is a voltage and current vector diagram for explaining the current limiting action of the third embodiment.
Figure 7:
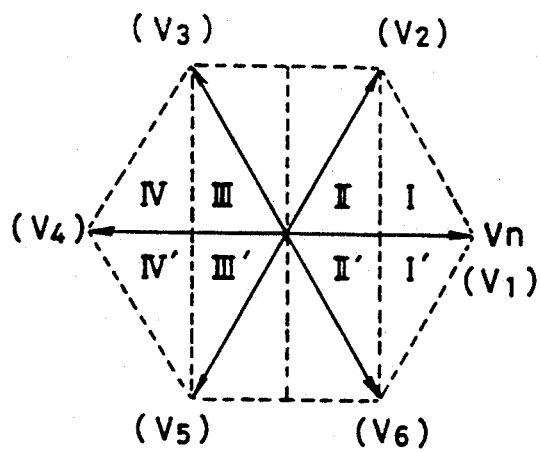
FIG. 7 is a diagram for illustrating the counter-electromotive force vector zones.

Next, the current limiting operation is described referring to FIGS. 6 and 7. First, FIG. 6 shows the voltage vector and current vector when the motor IM is being driven. Those vectors have a power-factor angle equal to or less than the electrical angle of 90 degrees. In FIG. 6, the current vector is also shown on the voltage vector coordinate system.

Now, let us suppose that the u-phase current exceeds its limit value in FIG. 6, and that the voltage vector provided by the inverter INV at that time is equal to $V_2$. The voltage vector $V_2$ has the switching pattern of (1 1 0). According to the conventional system, the u-phase arm of the switching pattern is forced to be changed from "1" to "0" so that the resulting switching pattern (0 1 0) corresponding to the voltage vector $V_3$ is obtained. Thus, (l·di/dt)" representing the rate of change of the current has the direction shown in FIG. 6, and so even the conventional system can reduce the current.

This rate of change (l·di/dt)" in the conventional system, however, is greater than the rate of change (l·di/dt) I that will occur for the output of the voltage vector $V_0$ having the switching pattern of (0 0 0), or the output of the voltage vector $V_7$ having the switching pattern of (1 1 1), resulting in the greater current ripple during the current limiting action. This suggests that a voltage vector that can limit the current flow with less current ripple can be obtained if the location of the current vector i and the location of the counter-electromotive force vector e can be determined when the current has exceeded its limit value.

In this case, the location of the current vector i can be specified by one of the zones Z1, ..., Z6 shown in FIG. 2 to which the current vector i belongs. Similarly, the location of the counterelectromotive force vector can be determined according to the zones Z1, ..., Z6 to which the current vector i belongs as described below.

As shown in FIG. 7, eight zones I, II, III, IV, I', II', III', and IV' can be specified by the zone Z1, ..., Z5, or Z6 shown in FIG. 2 to which the current vector i belongs. The zones are obtained as follows: assume that the voltage vector located in the particular zone to which the current vector i in question belongs is $V_n$. Moreover, assume that the current vector i is located in the zone Z1, for example. In this case, the zones are formed by specifying $V_n=V_l$ as in FIG. 7. Similarly, if the current vector i lies in the zone Z3, the zones are grouped by specifying as $V_n=V_3$.

Thus, determination of the zone to which the counter-electromotive force vector e belongs is achieved by assuming that the voltage vector lying in the particular zone to which the current vector i belongs is Vn. More specifically, this is performed by rotating the zone to which the current vector i belongs so that the zone will be superimposed on the zone to which the reference voltage vector $V_n$ ($=V_l$ in FIG. 7) belongs. Thus, any specific zone can be determined with reference to FIG. 7.

Consider an example where the current vector i in question is located in the zone Z1. In this case, the locations of the voltage vector are shown in parentheses in FIG. 7. It can be seen from FIG. 7 that the four zones I, I'; II, II'; III, III'; and IV, IV' are formed by vertical broken lines. This shows that the voltage vectors on the right side of the particular zone to which the counter-electromotive force vector e belongs can increase the current flow.

For example, if the counter-electromotive force vector e is located in the zone II when the current vector i lies in the zone Z1, the rate of current change (l·di/dt) which originates from the terminal of the counter-electromotive force vector e to the voltage vector $V_1$, $V_2$, or $V_6$ contains the positive component of the current vector i. Thus, the voltage vectors $V_1$, $V_2$, and $V_6$ will operate in the direction to increase the unphase current. Hence, selecting the other voltage vectors $V_0$, $V_7$, $V_3$, $V_4$, and $V_5$ than those mentioned above can reduce the uphase current. In particular, selecting the zero voltage vectors $V_0$ and $V_7$ can minimize the rate of current change (rate of reduction) l·di/dt, thus reducing the current ripple effect.

As another example, if the counter-electromotive force vector e is located in the zone I, and when the voltage vectors $V_2$, $V_6$ are selected, the current vector i will change at the same rate in terms of the rate of unphase current reduction because it contains a negative component having an equal magnitude, but in terms of the rate of current change di/dt, the selection of the voltage vector V2 can make the magnitude of di/dt smaller, as it may readily be understood.

The above discussion can similarly apply where the current vector i is located in the remaining zone Z2, ..., or Z6. In this way, according to the location of the current vector i, the appropriate voltage vector that can reduce the current flow with the smallest di/dt is selected by determining one of the eight zones shown in FIG. 7 to which the counter-electromotive force vector e belongs.

Table 3 presents the optimum voltage vectors that can reduce the current flow with the smallest di/dt when the locations of the current vector i and counter-electromotive force vector e are given. It should be noted that either the zero voltage vector $V_0$ or $V_7$ can be selected and used in Table 3.

TABLE 3

| Vector i | Locations of the counter-electromotive force vector Vector e | | | | | | | |
|---|---|---|---|---|---|---|---|---|
|  | I | II | III | IV | I' | II' | III' | IV' |
| Z1 | $V_2$ | $V_0$ | $V_3$ | $V_4$ | $V_6$ | $V_7$ | $V_5$ | $V_4$ |
| Z2 | $V_3$ | $V_7$ | $V_4$ | $V_5$ | $V_1$ | $V_0$ | $V_6$ | $V_5$ |
| Z3 | $V_4$ | $V_0$ | $V_5$ | $V_6$ | $V_2$ | $V_7$ | $V_1$ | $V_6$ |
| Z4 | $V_5$ | $V_7$ | $V_6$ | $V_1$ | $V_3$ | $V_0$ | $V_2$ | $V_1$ |
| Z5 | $V_6$ | $V_0$ | $V_1$ | $V_2$ | $V_4$ | $V_7$ | $V_3$ | $V_2$ |
| Z6 | $V_1$ | $V_7$ | $V_2$ | $V_3$ | $V_5$ | $V_0$ | $V_4$ | $V_3$ |

The optimum voltage vectors listed above may be determined by the current limiting circuit 20A shown in FIG. 5 as follows. When the output current i of the inverter INV, which is detected by the current detecting circuit 4, exceeds its limit value, the selector control signal is transferred from the comparators 6 the selecting circuit 2. Furthermore, the output current detected by the current detecting circuit 4 is also applied to the zone determining circuit 9 through the three-phase/two-phase conversion circuit 7 and the vector analyzer 8. The zone determining circuit 9 determines the particular zone Z1, . . ., or Z6 to which the current vector i belongs, and provides a rotation angle signal r indicating the amount by which the counterelectromotive force vector e should be rotated with regard to the current vector i. The rotation angle signal r is applied to the counter-electromotive force vector zone determining circuit 32.

On the other hand, the output current and output voltage of the inverter INV are applied to the counter-electromotive force vector detecting circuit 31 which provides the counter-electromotive force vector e. The counter-electromotive force zone determining circuit 32 determines the zone to which the counter-electromotive force vector 8 belongs among the above-mentioned zones I, . . ., IV, I', . . . and IV' on the basis of the counter-electromotive force vector e and the above-mentioned rotation angle signal r.

The zone-determined output from the current vector zone determining circuit 9 and the output from the counter-electromotive force vector determining circuit 32 are applied to the output pattern generating circuit 33. The circuit 33, referring to Table 3, selects the optimum voltage vector specified by the combination of both outputs from the circuits 9 and 32, and supplies the switching pattern (see Table 3) corresponding to the selected optimum voltage vector to the selecting circuit 2. In response to the output signal of the comparators 6, the selecting circuit 2 selects the output from the output pattern generating circuit 33 instead of the output from the PWM circuit 1, and controls the inverter INV so as to provide the appropriate voltage vector output to enable the current limiting action.

The zone determining circuit 9 is provided for determining the particular zone in FIG. 2 to which the current vector i belongs, and can be configured, for example, as shown in FIG. 16 (which will be described later), producing a 3-bit signal. This zone-determining signal from the circuit 9 contains the information on the amount of rotation required to superimpose the reference vector $V_n$ in FIG. 7 on one of the vectors $V_1, \ldots, V_5$, and $V_6$: the location of the reference vector $V_n$ can be uniquely determined to coincide with one of the vectors $V_1, \ldots,$ and $V_6$, depending upon the location of the current vector i. Thus, the zone-determining signal can be used as the above-described rotation angle signal r. It should be noted that this signal may be called either the zone-determining signal or rotation angle signal, depending upon the type of circuit in which the signal is used. In an actual circuit configuration, this signal may be used as an address signal. In this case, this signal may be used in different bit format for circuits 32 and 33. For this application, the output from the zone determining circuit 9 can be converted into the proper bit format in advance and then fed to the circuit 32 or 33, rather than being directly fed to the circuit.

Now, the specific arrangement of the circuits 31, 32, and 33 will be described.

Figure 18:
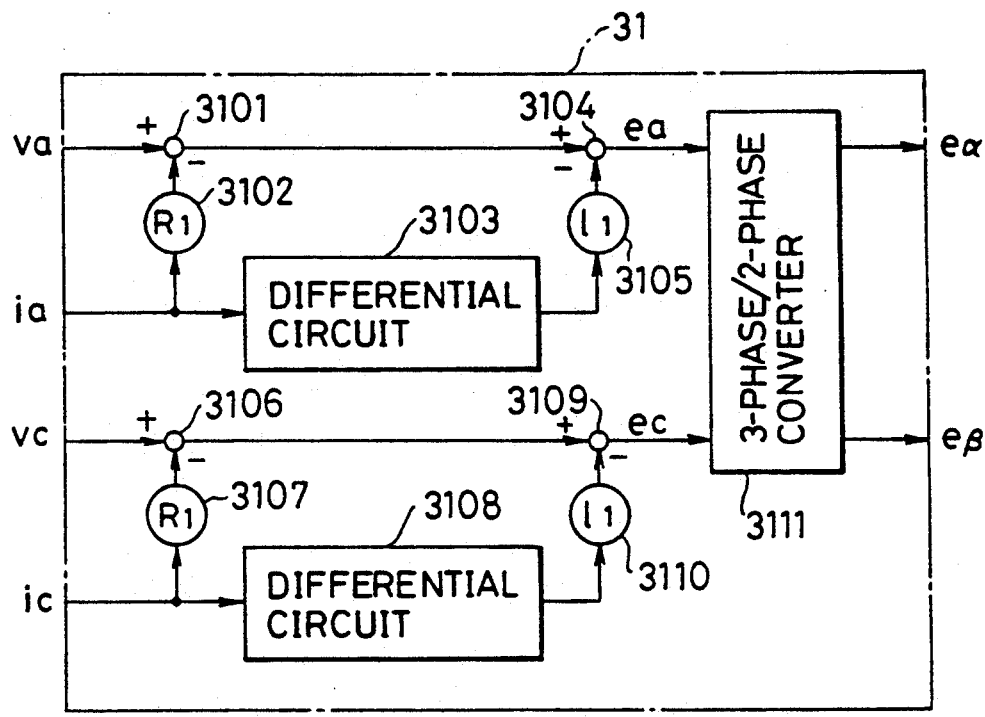
FIG. 18 is a block diagram showing an embodiment of the counter-electromotive force vector detecting circuit 31 shown in FIG. 5.

The counter-electromotive force vector detecting circuit 31 can be configured, for example, as shown in FIG. 18.

In FIG. 18, the detected a-phase voltage Va is fed to the positive input terminal of a subtracter 3101. The detected a-phase current $i_a$ is fed to a weighting circuit 3102 and a differential circuit 3103. The weighting circuit 3102 provides a weight factor R1 (where R1 denotes the primary resistance of the motor), and supplies the output current thereof to the negative input terminal of the subtracter 3101. The output of the subtracter 3101 is fed to the positive input terminal of another subtracter 3104. The output of the differential circuit 3103 is also fed to the subtracter 3104 through another weighting circuit 3105 which provides a weight factor l1 (where l1 denotes the primary leakage inductance of the motor). The subtracter 3104 provides an output ea, which is expressed by $$e_a = V_a - i_a R_1 - l_1 \frac{di_a}{dt}$$

Similarly, the detected c-phase voltage Vc is fed to the positive input terminal of a subtracter 3106. The detected c-phase current ic is fed to a weighting circuit 3107 and a differential circuit 3108. The weighting circuit 3107 provides a weight factor $R_1$, and the output current thereof is fed to the negative input terminal of the subtracter 3106. The output of the subtracter 3106 is fed to the positive input terminal of another subtracter 3109, and the output of the differential circuit 3108 is fed to the negative input terminal of the subtracter 3109 through another weighting circuit 3110 that provides a weight factor l1. The subtracter 3109 provides output ec, which is expressed by $$e_c = V_c - i_c R_1 - l_1 \frac{di_c}{dt}$$

The outputs ea and ec from the subtracters 3104 and 3109 are fed to a three-phase/two-phase conversion circuit 3111, which provides two-phase outputs $e\alpha$ and $e\beta$ that represent the counterelectromotive force vector. This conversion circuit 3111 can be configured in a manner similar to the converter 7 shown in FIG. 14.

Figure 19:
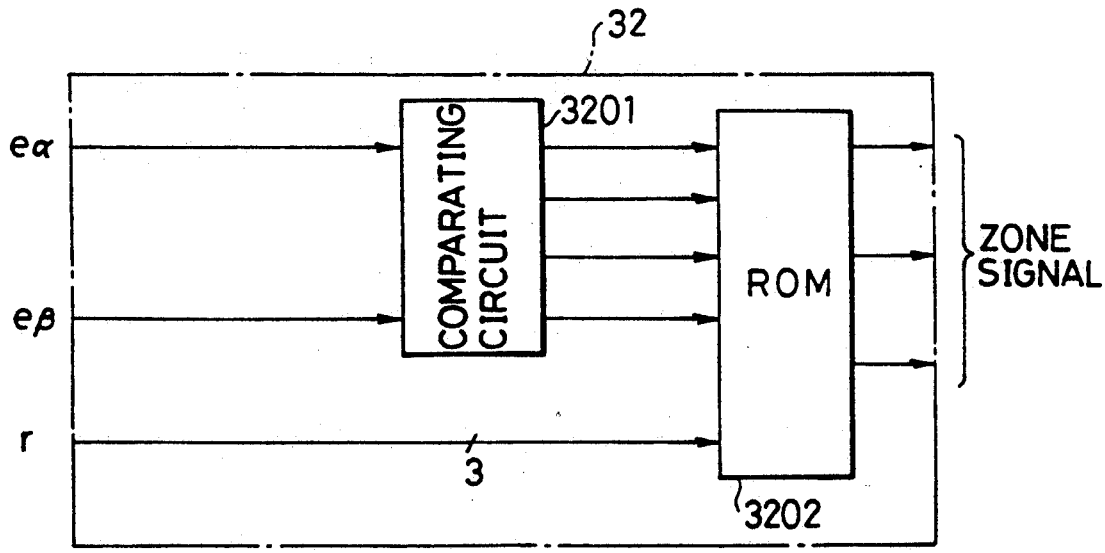
FIG. 19 is a block diagram showing an embodiment of the counter-electromotive force vector zone determining circuit 32 shown in FIG. 5.

FIG. 19 illustrates the specific form of the counter-electromotive force vector determining circuit 32. The outputs $e\alpha$ and $e\beta$ from the detecting circuit 31 are fed to the comparating circuit 3201. The comparating circuit 3201 selects one of the predefined sets of bit signals as does the zone determining circuit 9 shown in FIG. 16. Each set of bit signals corresponds to one of the zones I, . . ., and IV' shown in FIG. 7. Each set of bit signals and the rotation angle signal r are combined to form an address signal for the ROM 3202. The ROM 3202 contains the bit patterns that represent the zones I, . . ., and IV' for the counter-electromotive force vector (FIG. 7), including those bit patterns that are provided when the vector is rotated. Each bit pattern is retrieved from the location in the ROM addressed by the bit signals from the comparator circuit 3201 together with the bit signals of the rotation angle signal r. Thus, the zone-determining signal is produced.

Figure 20:
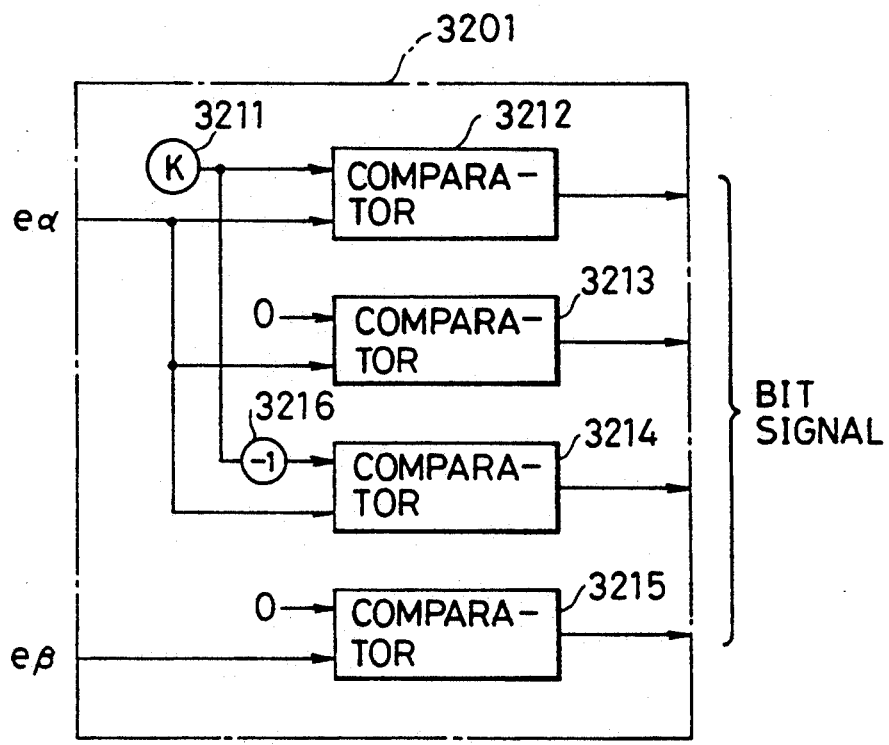
FIG. 20 is a block diagram showing an embodiment of the comparating circuit shown in FIG. 19.

The comparating circuit 3201 can be configured as shown in FIG. 20. In FIG. 20, reference numeral 3211 designates a constant circuit for setting a constant K (where K is ½ of the maximum value of the counter-electromotive force vector). Reference numerals 3212, 3213, 3214, and 3215 designate respective comparators, and 3216 denotes a polarity reversing circuit. To the comparator 3212, are supplied the constant K from the constant circuit 3211 and the two-phase output $e_\alpha$. To the comparator 3213, are supplied a reference of 0 and the two-phase output $e_\alpha$.

Notes:

Bit signal "1" means that the comparator condition is met. Bit signal "0" means that the comparator condition is not met.

Figure 21:
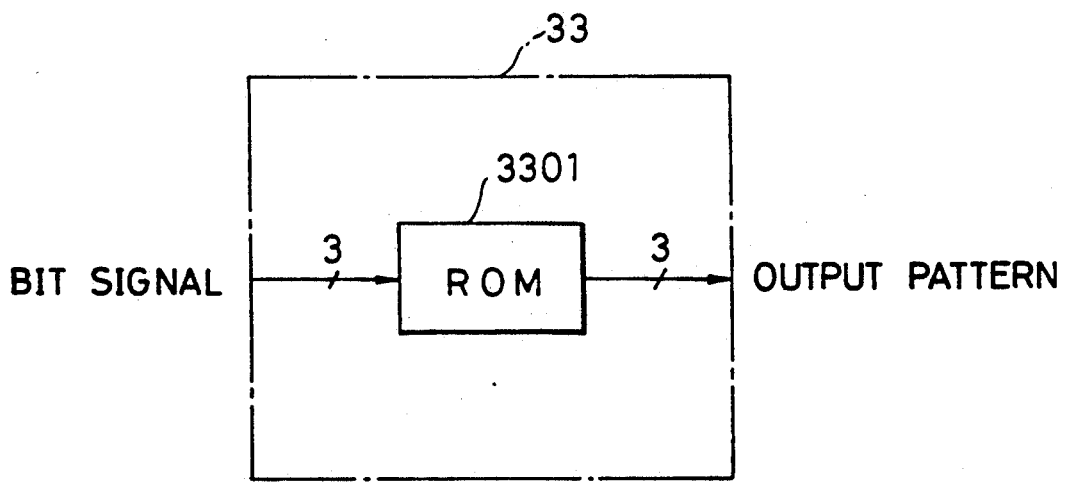
FIG. 21 is a block diagram showing an embodiment of the output pattern generating circuit 33 shown in FIG. 5.
Figure 23:
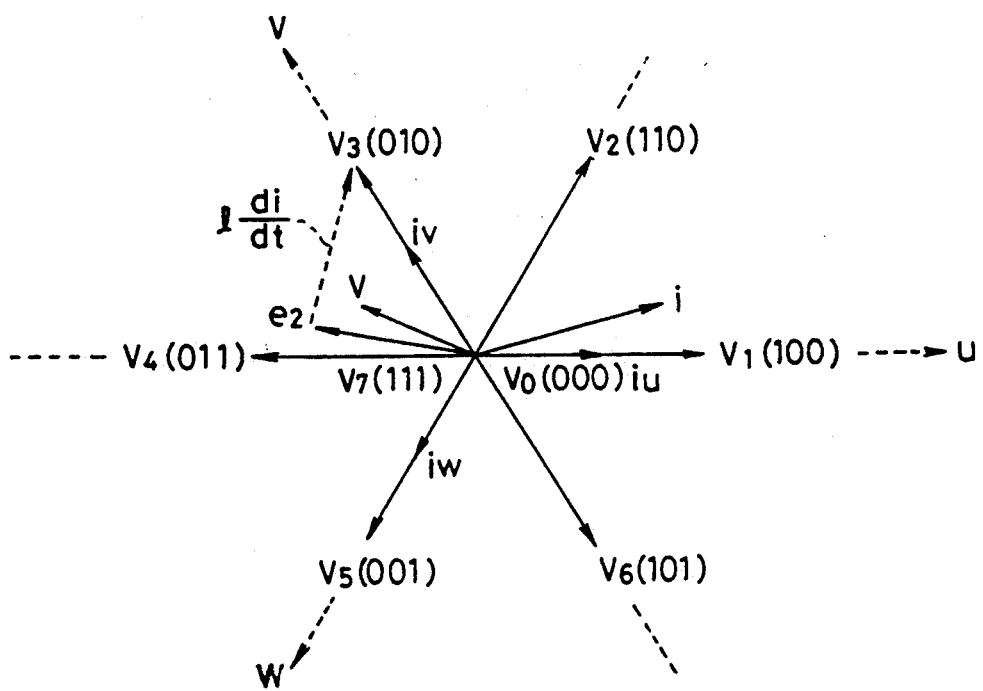
FIGS. 23 and 24 are voltage and current vector diagrams according to the relevant prior art, respectively.

The output pattern generating circuit 33 can be implemented by the ROM 3301 as shown in FIG. 21. The ROM 3301 contains the predetermined output patterns (see Table 3) corresponding to the vectors $V_0, V_1, ..., V_6$, and $V_7$. The zone signal for the current vector determined by the zone determining circuit 9 and the zone signal for the counterelectromotive force vector determined by the zone determining circuit 32 are combined to form an address signal, which addresses the appropriate location in the ROM from which the output data is read out as the output pattern.

FOURTH EMBODIMENT

Next, an embodiment of the third aspect of the present invention is described with reference to FIGS. 8 and 9.

The first aspect of the present invention described above ensures that the output current of the inverter INV can be reduced regardless of whether the motor IM is being driven or being braked. However, as readily seen by comparing the l·di/dt in FIG. 2 and the (l·di/dt)l in FIG. 24, the magnitude of di/dt of the first aspect of the present invention is greater than that of FIG. 24 when the motor IM is being driven.

Figure 24:
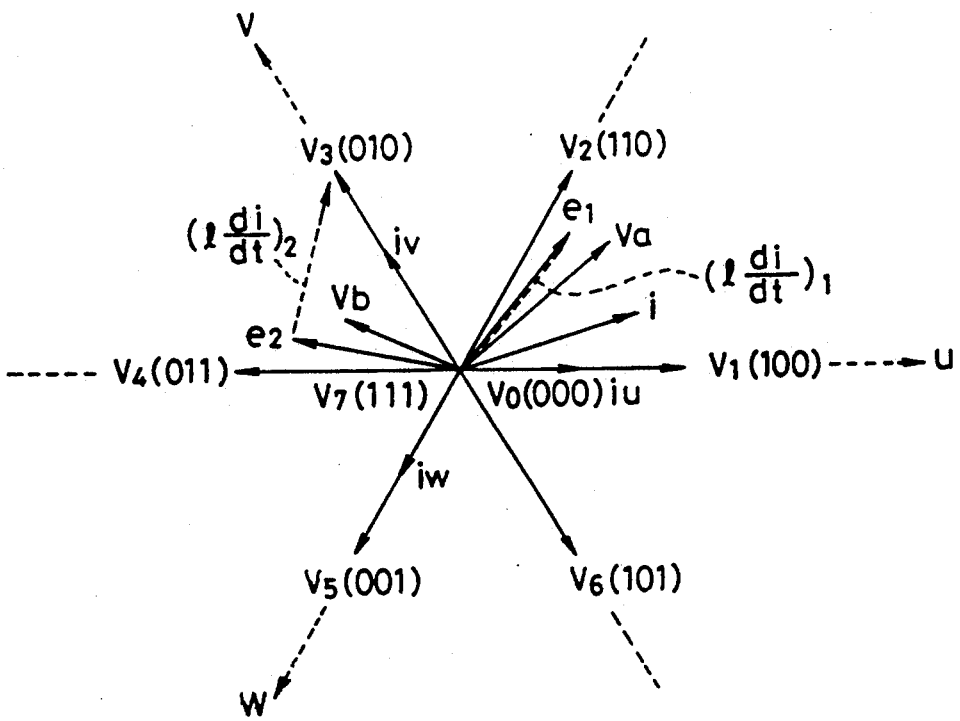

This means that, if the switching time of transistors is identical, the rate of reduction of the output current of the inverter INV during the current limit action is greater in the first aspect of the present invention than in the prior art in FIG. 24. During the current limiting action, however, it is desirable that the output current be maintained at the limit value as in the second aspect of the present invention. Thus, the first aspect of the present invention, which produces larger current ripple during the current limit action when the motor IM is being driven, poses a problem.

Therefore, the third aspect of the present invention provides a configuration based on the above considerations; one specific embodiment of which will be described below.

Figure 8:
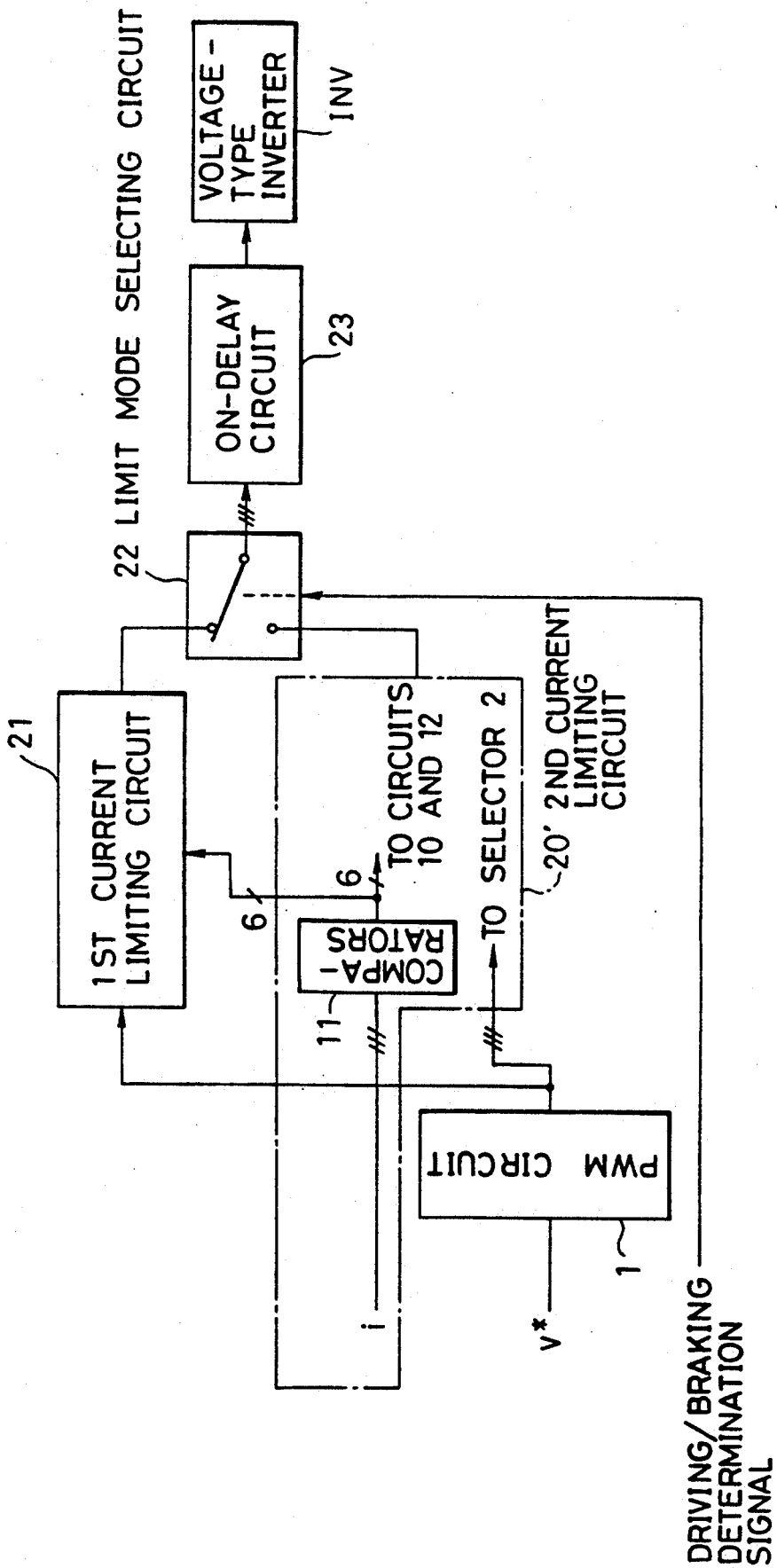
FIG. 8 is a block diagram showing a current limiting circuit used in the fourth embodiment of the present invention.

Referring to FIG. 8, the second current limiting circuit 20' is equivalent to the current limiting circuit 20' in FIG. 4. To this circuit 20', as in the second embodiment, are supplied the current vector i from the output of the inverter INV and the switching pattern from the PWM circuit 1. Furthermore, a first current limiting circuit 21 is provided in addition to the second current limiting circuit 20'. The first current limiting circuit 21 is configured, for example, as shown in FIG. 9. To the circuit 21 are supplied the output of the comparators 11 within the second current limiting circuit 20' and the switching pattern outputted from the PWM circuit 1.

Furthermore, the outputs of the first and second current limiting circuits 21 and 20' are applied to the current-limit mode selecting circuit 22. This selecting circuit 22 is enabled by the driving/braking determining signal of the motor IM to provide the switching action between the inputs. The driving/braking determining signal of the motor IM is provided, for example, by a microcomputer or the like that performs the operation to compute a voltage value V*. The output of the selecting circuit 22 is fed to the inverter INV through an on-delay circuit 23.

Figure 9:
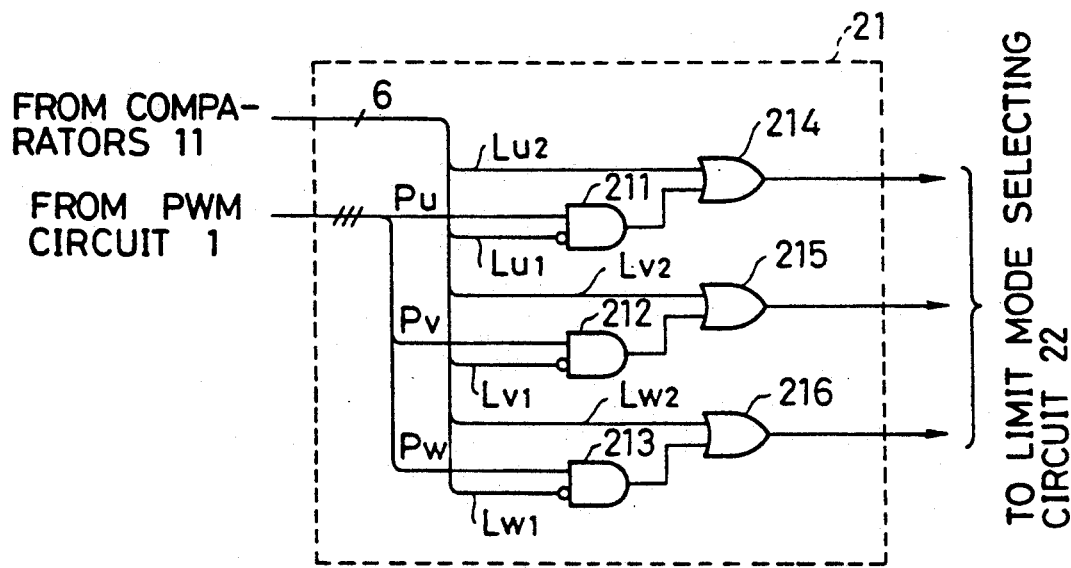
FIG. 9 is a logic circuit diagram showing an example of the arrangement of a first current limiting circuit according to the fourth embodiment.

Next, FIG. 9 shows an example of the implementation of the first current limiting circuit 21. In FIG. 9, the output lines $Lu_1, Lu_2; Lv_1, Lv_2$ and $Lw_1, Lw_2$ correspond to the positive and negative polarities of the output current of each phase in the inverter INV, respectively. The respective output lines ($Lu_1$ and $Lu_2$), ($Lv_1$ and $Lv_2$) and ($Lw_1$ lot and $Lw_2$) will assume three states (0, 0), (1, 0), and (0, 1) for each phase if it is assumed that the comparator produces "1" when the current limiting action is in operation. Among those comparator output lines, $Lu_1, Lv_1$, and $Lw_1$ are connected to respective inverting input terminals of AND gates 211, 212, and 213. The remaining output lines $Lu_2, Lv_2$ and $Lw_2$ are connected to respective noninverting input terminals of OR gates 214, 215 and 216.

On the other hand, each set of the switching patterns provided by the PWM circuit 1 is transferred through the output lines Pu, Pv, and Pw, and is fed to the other input terminal of respective AND gates 211, 212, and 213. Each output terminal of the AND gates 211, 212, and 213 is connected to the other input terminal of the respective OR gates 214, 215, and 216. Each output terminal of the OR gates 214, 215, and 216 is connected to the current-limit mode selecting circuit 22.

The operation of the above-described embodiment is now described. When the motor IM is being driven, the input of the current-limit mode selecting circuit 22 is connected to the first current limiting circuit 21 which accomplishes the current limiting action. When the current limiting action is not in operation for any of the phases in the inverter INV, the switching pattern provided by the PWM circuit 1, for example (1 0 0), will be fed to the current limiting circuit 21. The switching pattern is fed to the current-limit mode selecting circuit 22, to the on-delay circuit 23, and then to the inverter INV.

In contrast, if u-phase current exceeds the positive limit value, the logical value from the output line $Lu_1$ changes from "0" to "1". As a result, the logical value of the output of the OR gate 214 becomes "0", and the output of the current limiting circuit 21 changes to the pattern (0 0 0).

Thus, the unphase bit of the switching pattern is forced to change from "1" to "0". This will reduce the u-phase current by turning the transistor off in the upper arm for the phase u, as described in full detail earlier. The l·di/dt at that time corresponds to the $(l·di/dt)_1$ in FIG. 24, and so di/dt is smaller than that of FIG. 2, thus maintaining the current flow at its limit value.

When the motor IM is to be braked, the input of the current limit mode selecting circuit 22 is switched to the second current limiting circuit 20' which executes the current limiting action in a manner similar to the second embodiment. Although the operations will not be described to avoid repetitious description, the action will be performed as shown in FIG. 3, when the u-phase current exceeds its positive limit value. This will ensure the reduction of the current.

FIFTH EMBODIMENT

Figure 11:
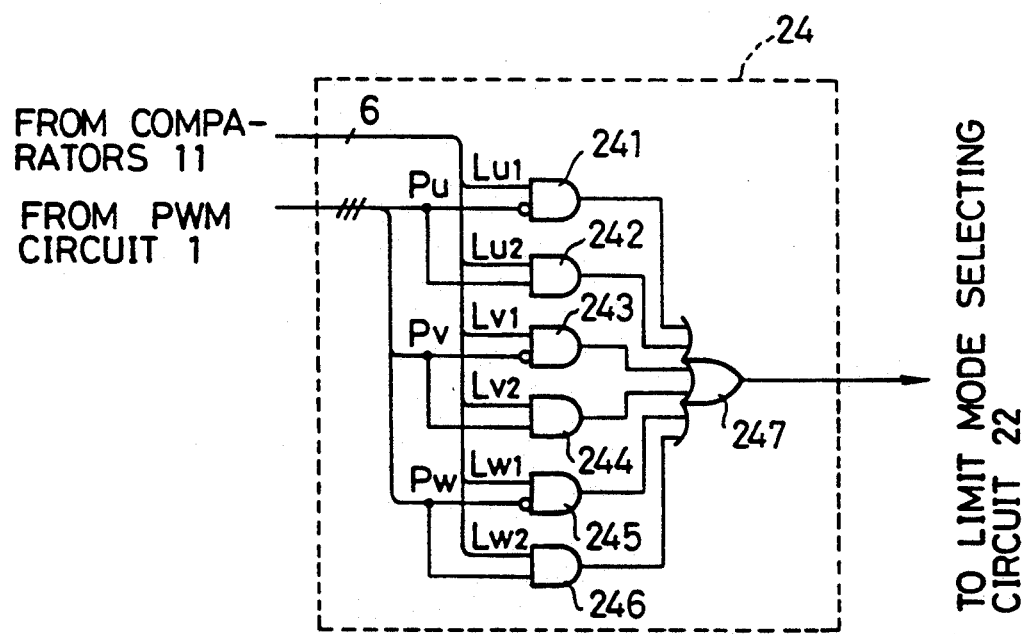
FIG. 11 is a logic circuit diagram showing an example of the arrangement of the decision circuit that determines the optimum current limiting action to be selected according to the fifth embodiment.
Figure 10:
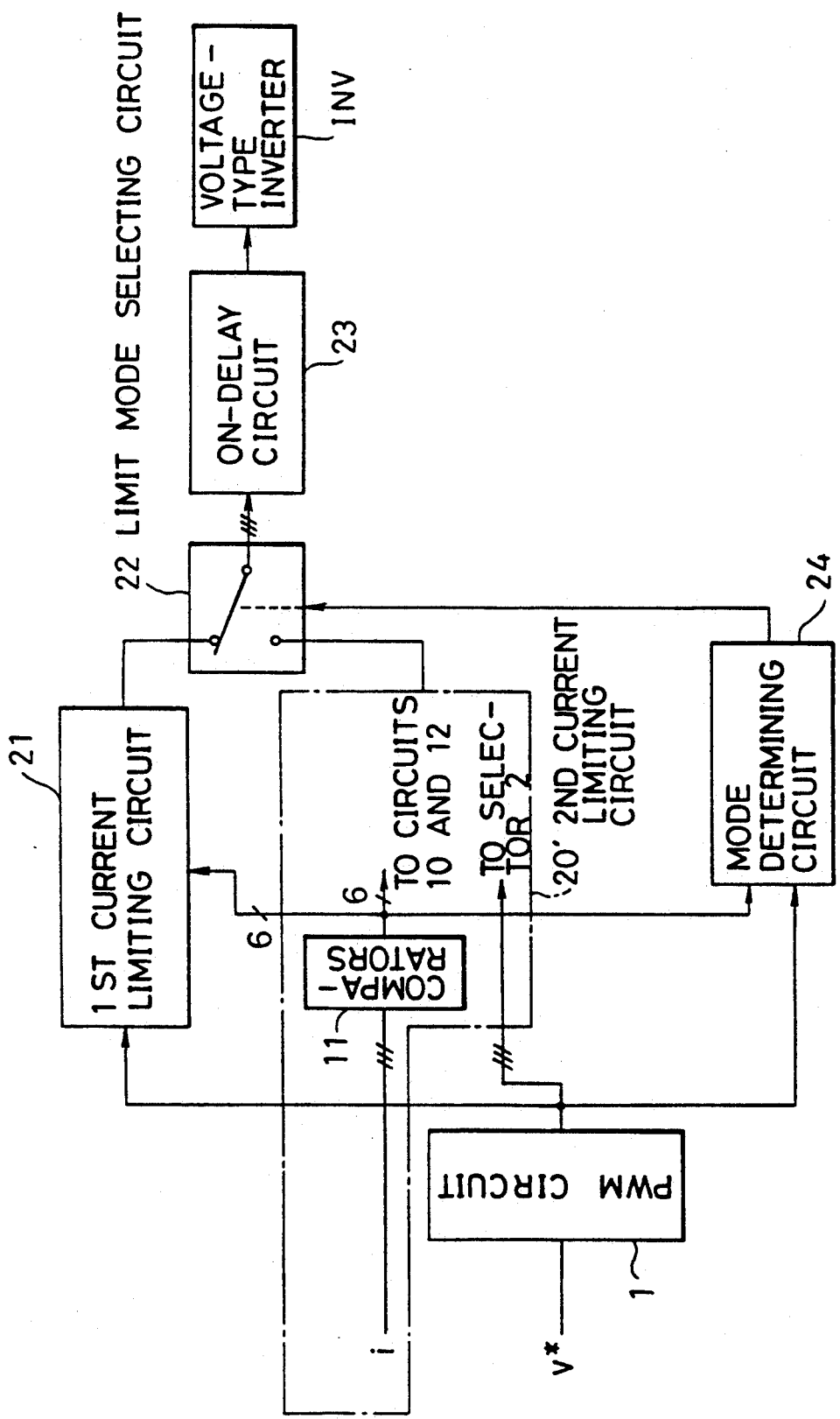
FIG. 10 is a block diagram showing the current limiting circuit used in the fifth embodiment of the present invention.

Next, FIGS. 10 and 11 show an embodiment of the fourth aspect of the present invention. As the third aspect of the present invention, the fourth aspect also switches between the first and second current limiting circuits. This ensures that the current flow can be limited under any circumstances and that the rate of current reduction can be minimized to reduce any possible current ripple effect at the time when the current limiting action is effective.

The fifth embodiment of the present invention shown in FIG. 10 mainly differs from the embodiment of the third aspect of the present invention shown in FIG. 8 in that the fifth embodiment is provided with the mode determining circuit 24. In FIG. 10, the second current limiting circuit 20' is equivalent to the second current limiting circuit 20' in FIG. 8. The first current limiting circuit 21 is configured like that shown in FIG. 8, and is supplied with the outputs of the comparators 11 as well as the switching pattern output of the PWM circuit 1.

The mode determining circuit 24 has six lines connected to the comparators 11 for determining whether any phase current in the inverter exceeds its positive or negative limit value, and has three lines connected to the output of the PWM circuit 1 from which the switching patterns for respective phases are outputted. In response to the signals from those lines, the mode determining circuit 24 determines which of the first and second current limiting circuits 21 and 20' should perform the current limiting action, and then provides a selector control signal which controls the switching operation of the limit mode selecting circuit 22. When the output signal from the mode determining circuit 24 has a logical value of "1", the limit mode selecting circuit 22 switches to select the output of the second current limiting circuit 20'. In contrast, when the output signal has a logical value of "0", the limit mode selecting circuit 22 switches to select the output of the first current limiting circuit 21.

Next FIG. 11 shows an example of the specific configuration of the mode determining circuit 24. In FIG. 11, reference numerals 241, ..., and 246 designate AND gates. The switching pattern for each phase provided by the PWM circuit 1 is transmitted through respective lines Pu, Pv and Pw, and is fed in its inverted or noninverted form to the respective input terminals of the AND gates 241, ..., and 246 as shown in FIG. 11.

Each pair of the output lines $Lu_1$, $Lu_2$; $Lv_1$, $Lv_2$; and $Lw_1$, $Lw_2$ from the comparators 11 corresponds to whether the phase current exceeds its positive or negative limit value. Those output lines $Lu_1$, ..., and $Lw_2$ are connected to the other input terminals of the respective AND gates 241, ..., and 246. The output signals of the AND gates 241, ..., and 246 are applied to an OR gate 247. The OR gate 247 supplies an OR output signal to the limit mode selecting circuit 22 as a selector control signal.

Here, the possible logical values that the output lines $Lu_1$, ..., and $Lw_2$ can take are described. If the u-phase current exceeds its positive limit value, the output line Lu1 will take a logical value "1". On the other hand, if the u-phase current exceeds its negative limit value, the output line $Lu_2$ will take a logical value "1". Similarly, if the v-phase current exceeds its positive limit value, the output line Lv1 will take a logical value "1", whereas if the v-phase current exceeds its negative limit value, the output line $Lv_2$ will take a logical value "1". Furthermore, if the w-phase current exceeds its positive limit value, the output line $Lw_1$ will take a logical value "1", and if the w-phase current exceeds its negative limit value, the output line $Lw_2$ will take a logical value "1".

The operation of the above-described embodiment is now described. For example, when the inverter INV provides the voltage vector $V_3$ shown in FIGS. 2 and 3, which is associated the switching pattern (0 1 0), and the u-phase current exceeds its positive limit value, the output line $Lu_1$ will take a logical value "1", and the output line Pu at this time will take a logical value "0". As a result, the AND gate 241 produces the output signal of value "1", and the OR gate 247 produces the output signal of logical value "1". The output signal of the OR gate 247 is applied to the limit mode selecting circuit 22. Incidentally, the output signals of the other AND gates 242, ..., and 246 provide the output signals of "0".

According to the OR output signal from the OR gate 247, the limit mode selecting circuit 22 carries out switching to select the output of the second current limiting circuit 20'. Thus, the second current limiting circuit 20' performs the current limiting action. More specifically, the second current limiting circuit 20', as described in the second embodiment, selects the voltage vector $V_4$ which is located nearest to the vector having the direction opposite to that of the current vector i. This means that the switching pattern (0 1 1) is selected and fed to the limit mode selecting circuit 22. This enables the inverter INV to continue supplying the voltage vector $V_4$. Thus, the u-phase current is reduced as described in the second embodiment.

On the other hand, if the u-phase current exceeds its positive limit value while the inverter INV provides the voltage vector $V_1$ associated with the switching pattern of (1 0 0), the output line Lu1 takes a logical value "1", and the output line Pu takes a logical value "1". As a result, the AND gate 241 will provide the output signal of "0", and all the other AND gates 242, ..., and 246 will also provide the output signals of "0". Consequently, the OR gate 247 provides OR output signal of "0", and so the selector control signal of value "0" is applied to the limit mode selecting circuit 22. In response to this selector control signal, the limit mode selecting circuit 22 switches to select the output from the first current limiting circuit 21. Thus, the current limiting action by the current limiting circuit 21 is executed.

As described so far, the switching of the voltage vector from its original pattern of $V_1$ (1 0 0) to the new pattern of $V_0$ (0 0 0) makes it possible to limit the current flow with smaller rate of current reduction during the limiting action. This makes it possible to reduce the current ripple.

When no current limiting action occurs for any of the phases, the first and second current limiting circuits 21 and 20' will transfer the switching pattern from the PWM circuit 1 without changing the pattern.

SIXTH EMBODIMENT

Figure 12:
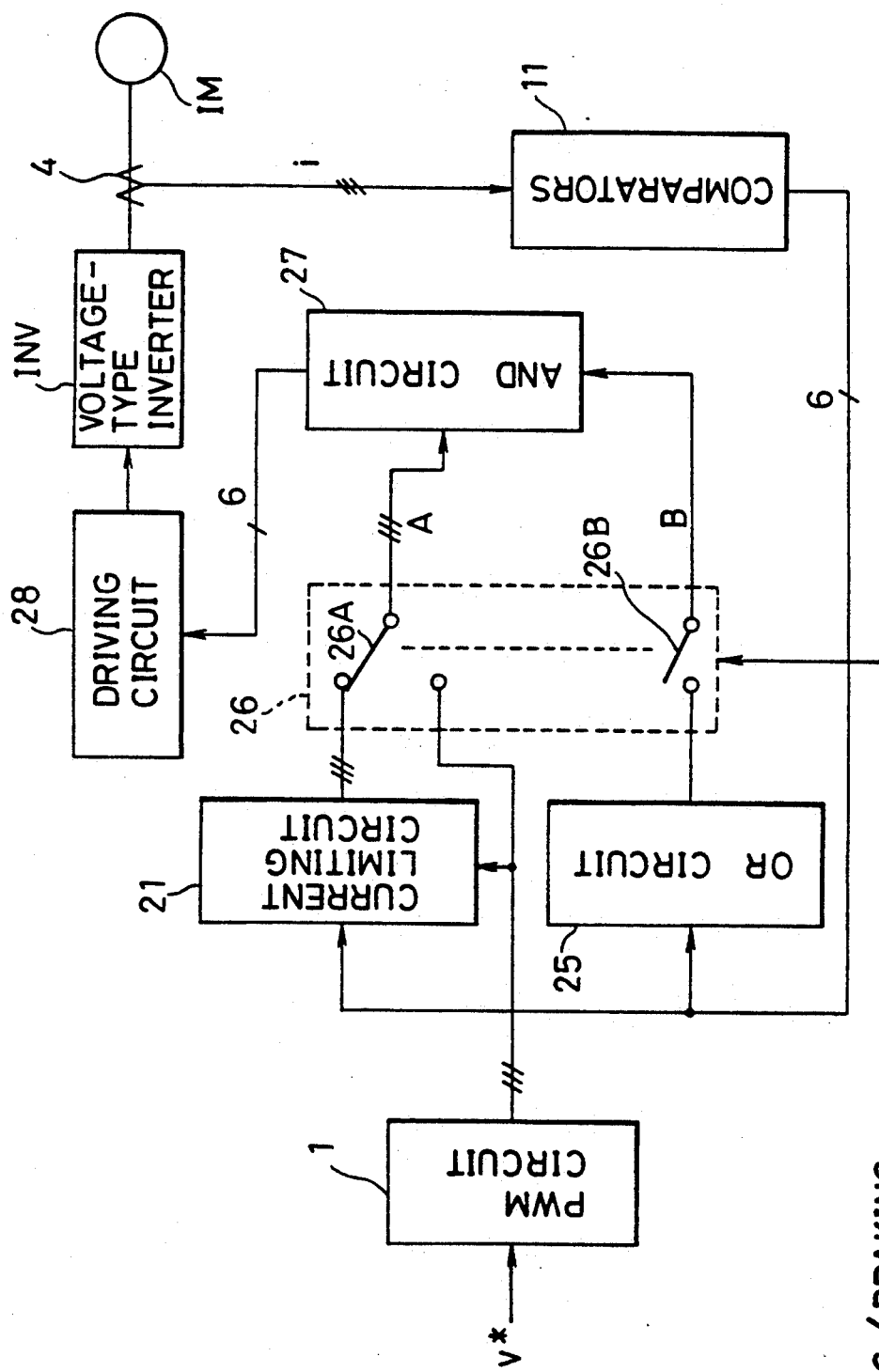
FIG. 12 is a block diagram showing a current limiting circuit used in a sixth embodiment of the present invention.
Figure 13:
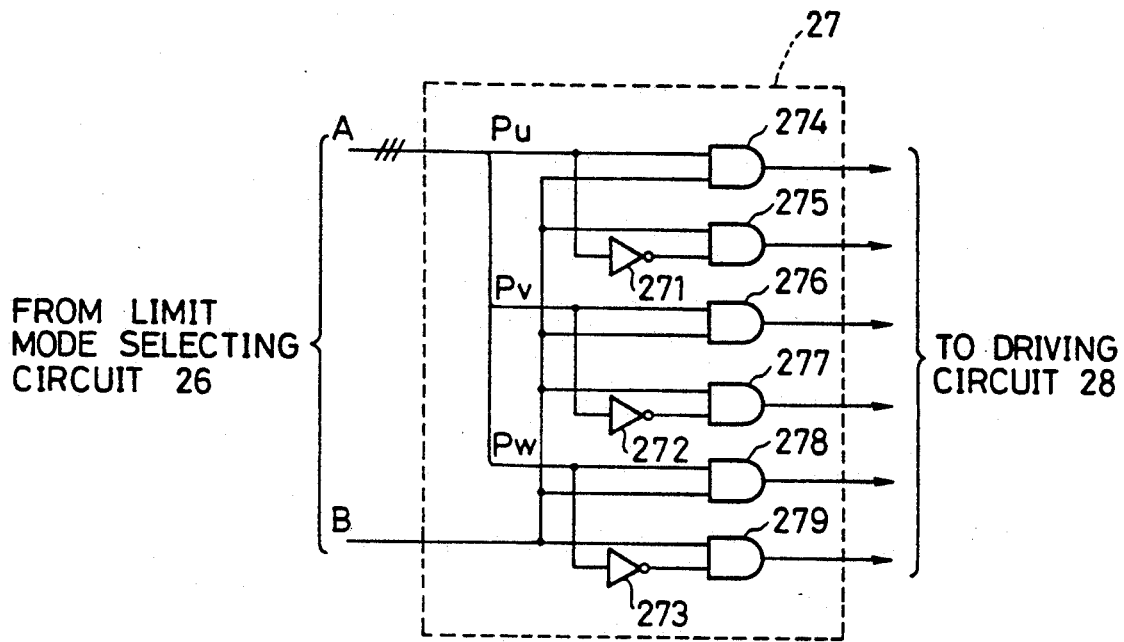
FIG. 13 is a logic circuit diagram showing an example of the arrangement of an AND circuit according to the sixth embodiment.
Figure 22:
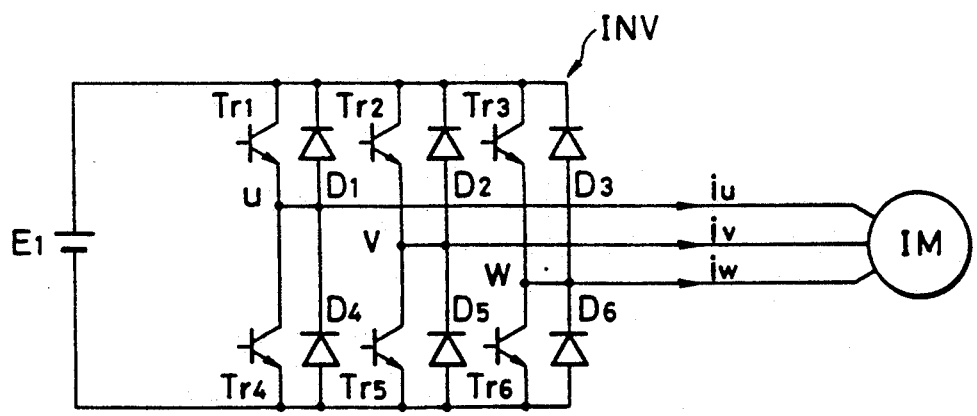
FIG. 22 is a circuit diagram showing a main circuit arrangement of the voltage-type inverter for explaining the relevant prior art.

FIGS. 12 and 13 show an embodiment of the fifth aspect of the present invention.

As described above, the first current limiting circuit 21 can limit the output current in the inverter INV when the motor IM is being driven. Likewise, the present invention can accomplish the current limiting action when the motor IM is being braked as described in the preceding various embodiments.

As one of the several alternative ways of protecting the voltage-type inverter against any possible unusual output currents by rapidly reducing the output current of the inverter INV, an all-phase-pulse-off method can be adapted: the drive pulses for the switching elements of all the phases in the inverter INV are uniformly turned off. This all-phase-pulse-off method, if carried out when the motor IM is being driven, will result in a greater rate of current reduction than that in the case where the first current limiting circuit 21 performs the current limiting action. This presents a new problem that the current ripple will be greater in the all-phase-pulse-off method than in the first current limiting circuit 21, when the switching time of the transistors used in the current limiting action by the all-phase-pulse-off method is set equal to that by the first current limiting circuit 21. As described earlier, the current flow should be maintained at its limit value during the current limiting action. Consequently, the all-phase-pulse-off method cannot be applied equally to both driving and braking the motor IM.

The fifth aspect of the present invention is achieved in light of the above facts: it adopts the current limiting action by the first current limiting circuit 21 when the motor IM is being driven; whereas it adopts the current limiting action by the all-phase-pulse-off method that uniformly turns off all the switching elements when the motor IM is being braked.

More specifically, referring to FIG. 12, the current detecting signal i from the current detecting circuit 4 is fed to the comparators 11, which determines whether each phase current exceeds its positive or negative limit value or not. The comparators 11 provide six control signals to be fed to the current limiting circuit 21 having a similar configuration as the circuit shown in FIG. 9. All the six control signals will have the logical value "1" if all the phase currents exceed their limit values. Therefore, the first current limiting circuit 21 will pass the switching pattern from the PWM circuit 1 without changing it unless all the phase currents exceed their limit values when the motor is being driven or when the motor is being braked.

In contrast, when any one of the six control signals takes logic value "1" while the motor is being braked, that is, when any one of the phase currents exceeds its positive or negative limit value, all-phase-pulse-off signal B of logic value "0" is produced from an OR gate 25 to which the six control signals from the comparators 11 are fed. Thus, all the switching elements are uniformly turned off.

The outputs of the OR gate 25 and current limiting circuit 21 are connected to a switching circuit 26 having switches 26A and 26B. This switching circuit 26 provides a switching pattern A or all-phase-pulse-off signal B by turning the switch 26A or 26B on according to the driving/braking determination signal. The driving/braking determination signal is a signal for determining the driving/braking status of the motor IM, and is provided from the microcomputer or any other similar processor for operating and producing the voltage command value V*.

When the motor IM is being driven, the driving/braking determination signal will take logical value "1", and the switches 26A and 26B will have their respective positions as shown in FIG. 12. In this case, the switching circuit 26 produces switching pattern A consisting of the output from the PWM circuit 1 when none of the phase currents exceed their limit values, or the output from the current limiting circuit 21 when any one of the phase currents exceeds its limit value. On the other hand, when the motor IM is being braked, the driving/braking determination signal will have logical value "0", and the switches 26A and 26B will have their respective positions opposite to those shown in FIG. 12. In this case, the switching pattern from the PWM circuit 1 is directly outputted as the switching pattern A when none of the phase currents exceed their limit values, whereas the all-phase-pulse-off signal B from the OR circuit 25 is produced when any of the phase currents exceeds its limit value as described above.

Those switching pattern A and all-phase-pulse-off signal B are applied to an AND-gate circuit 27 of the next stage. The OR circuit 25, switching circuit 26 and AND circuit 27 constitute an all-element-off circuit for turning all the switching elements off when the output current of any phase exceeds its positive or negative limit value.

The AND circuit 27 can be configured, for example, as shown in FIG. 13. The AND circuit 27 includes three NOT circuits 271, 272, and 273, AND gates 274, 276 and 278, and AND gates 275, 277 and 279. The input terminals of NOT circuits 271, 272 and 273 are connected to the output lines Pu, Pv and Pw of the switching pattern A, respectively. The first input terminals of the AND gates 274, 276 and 278 are connected to the output lines Pu, Pv and Pw, respectively. To the second input terminals of the AND gates 274, 276 and 278 is applied the all-phase-pulse-off signal B. The first input terminals of the AND gates 275, 277 and 279 are connected to the output terminals of the NOT circuits 271, 272 and 273, respectively. To the second input terminals of the AND gates 275, 277 and 279 is applied the all-phase-pulse-off signal B. The six AND outputs from the AND gates 274-279 are fed to the drive circuit 28 that drives the switching elements in the upper and lower arm for each phase in the inverter INV.

The operation of the embodiment will now be described in conjunction with the operation of the AND circuit 27 in FIG. 13.

When the motor IM is driven, the switches 26A and 26B in the switching circuit 26 are initially set at their respective positions as shown in FIG. 12, and so the current limit mode provided by the current limiting circuit 21 is selected. As described above, the switch 26A in the switching circuit 26 is connected to the current limiting circuit 21 or PWM circuit 1 according to the driving/braking determination signal. More specifically, when none of the phase current exceeds the current limiting value, the switching pattern from the PWM circuit 1 is directly supplied to the AND circuit 27 as the switching pattern A via the current limiting circuit 21. On the other hand, if any phase current, u-phase current, for example, exceeds its positive limit value, the switching pattern produced from the current limiting circuit 21 is supplied to the AND circuit 27 as the switching pattern A so that the u-phase switching element in the upper arm is turned off. If the u-phase current exceeds the negative limiting value, the switching pattern produced from the current limiting circuit 21 is supplied to the AND circuit 27 as the switching pattern A so that the u-phase switching element in the lower arm is turned off.

If all the phase currents are within their limit values, the all-phase-pulse-off signal B from the OR circuit 25 takes the logical value "1", which is not transmitted to the AND gate 27 because the switch 26B is in its open state. However, the open state i)10 of the switch 26B provides the logical value "1", which is supplied to the AND gate 27. As a result, the AND circuit 27 produces six signals consisting of the above-described switching pattern A and the inverted signals of the pattern A, which is supplied to the drive circuit 28. The drive circuit 28, responding to those signals, drives the switching elements of each phase in the upper and lower arms. Thus, if the current exceeds its limit value during the motor IM is driven, the switching pattern A from the current limiting circuit 21 sets l·di/dt to (l·di/dt)l in FIG. 24, thus ensuring the current reduction.

On the other hand, when the motor is braked, the switches 26A and 26B in the switching circuit 26 are placed at their respective positions opposite to those shown in FIG. 12. Thus, the current limiting mode based on the all-phase-pulse-off signal B from the OR circuit 25 constituting the all-element-off circuit is selected. In this condition, if any phase current exceeds its positive or negative limit value, the all-phase-pulse-off signal B provided by the OR circuit 25 takes the logical value "0". As a result, the switching pattern A cannot pass the AND circuit 27 and all the outputs of the AND circuit 27 are "0", which turn all phase pulses off. Consequently, all the switching elements in the inverter INV are forced to be off, thus rapidly reducing any unusual output current that can occur in the inverter when the motor IM is being braked.

Although the preceding embodiments of the present invention are described by assuming that the u-phase current exceeds its limit value, the present invention can also be applied to the case where the negative limit value is exceeded by the v-phase or w-phase currents.

Furthermore, the present invention can be achieved not only by the hardware described in connection with the various embodiments, but also by software implementation that performs such procedure as selecting the switching pattern that corresponds to the prestored voltage vector when any phase current exceeds its limit value.

In addition, this voltage-type inverter can be applied not only to the induction motor but also to the synchronous motor.

INDUSTRIAL APPLICABILITY

As described above, the present invention ensures that the inverter can reduce the output current irrespective of the driving/braking state of the motor, or of the position of the selected voltage vector.

In particular, the first aspect of the present invention can reliably limit the output current of the inverter regardless of the driving/braking state of the motor.

The second, third and fourth aspects of the present invention can maintain the output current at its specific limit value. In addition, it can reduce the current ripple caused by the current limiting action by reducing the rate of current reduction of the output current in the condition that switching frequency is maintained at a particular value.

The fifth aspect of the present invention selectively uses two current limiting modes: when the motor is driven, the current limiting mode performed by the first current limiting circuit is used; when the motor is braked, the current limit mode controlled by the all-phase-pulse off system is used. This system can effectively reduce the rate of current reduction of the output current, and hence can reduce the current ripple during the current limiting action. This is an advantage over the conventional current limiting mode in which only the current limiting by the all-phase-pulse-off system is performed in both driving and braking of the motor.

We claim:

1. A current limit system for use in a voltage-type inverter comprising:
   first means for detecting the magnitude of an output current vector of the voltage-type inverter to determine if the magnitude exceeds a predetermined limit value, said first means including:
      detecting means for detecting the output currents of said voltage-type inverter; and
      comparator means for comparing said output currents detected by said detecting means with said predetermined limit value;
   second mans for determining the location of said output current vector;
   sixth means for determining the location of the counterelectromotive force vector of a load of said voltage-type inverter according to the output current and output voltage of said voltage-type inverter; and
   seventh means for selecting a voltage vector which reduces said output current in such a way that the rate of reduction of said output current is minimized on the basis of the locations of said output current vector and counter electromotive force vector, and for enabling said voltage-type inverter to produce said selected voltage vector as the output, when the magnitude of said output current vector exceeds its limit value, said seventh means including:
      determination means for determining the location of said output current vector and for providing a rotation angle signal that specifies the amount of rotation necessary for the counter-electromotive force vector to rotate with regard to the determined location of said output current vector;
      counter-electromotive force vector determination means for determining the location of said counter-electromotive force vector according to said counter-electromotive force vector provided by said sixth means and said rotation angle signal provided by said determining means; and
      output pattern generating means for producing one of the predetermined switching patterns in response to said rotation angle signal and said determination output from said counter-electromotive force vector determination means.

2. A current limit system for use in a voltage-type inverter comprising:
   first means for determining the magnitude of an output current vector of the voltage-type inverter to determine if the magnitude exceeds a predetermined limit value, said first means including;
      detecting means for detecting the output currents of said voltage-type inverter; and
      comparator means for comparing said output currents detected by said detecting means with said predetermined limit value;
   second means for determining the location of said output current vector;
   third means for selecting a voltage vector wherein the location of said selected voltage vector is closest to a vector having the opposite direction to said output current vector determined by said second means, and for enabling said voltage-type inverter to produce selected voltage vector as the output, when the magnitude of said output current vector exceeds said predetermined limit value;
   fourth means for producing a particular switching pattern in response to an inputted voltage command; and
   fifth means for selecting, in response to the detecting output provided by the first means, either the switching pattern corresponding to the voltage vector selected by said third means or the switching pattern for said fourth means, and outputting said selected switching pattern;

sixth means for determining the location of the counterelectromotive force vector of a load of said voltage-type inverter according to the output current and output voltage of said voltage-type inverter; and seventh means for selecting a voltage vector which reduces said output current in such a way that the rate of reduction of said output current is minimized on the basis of the locations of said output current vector and counter electromotive force vector, and for enabling said voltage-type inverter to produce said selected voltage vector as the output, when the magnitude of said output current vector exceeds its limit value, said seventh means including:

determination means for determining the location of said output current vector and for providing a rotation angle signal that specifies the amount of rotation necessary for the counter-electromotive force vector to rotate with regard to the determined location of said output current vector; counter-electromotive force vector determination force vector provided by said sixth means and said rotation angle signal provided by said determination means; and output pattern generating means for producing one of the predetermined switching patterns in response to said rotation angle signal and said determination output from said counter-electromotive force vector determination means.

* * * * *